(12) United States Patent
Watson et al.

(10) Patent No.: US 9,300,018 B2
(45) Date of Patent: Mar. 29, 2016

(54) ENERGY SOURCE SYSTEM HAVING MULTIPLE ENERGY STORAGE DEVICES

(75) Inventors: Thomas M. Watson, Milwaukee, WI (US); Junwei Jiang, Glendale, WI (US); Perry M. Wyatt, Fox Point, WI (US)

(73) Assignee: Johnson Controls Technology Company, Holland, MI (US)

( * ) Notice: Subject to any disclaimer, the term of this patent is extended or adjusted under 35 U.S.C. 154(b) by 867 days.

(21) Appl. No.: 13/422,514

(22) Filed: Mar. 16, 2012

(65) Prior Publication Data

US 2012/0235511 A1   Sep. 20, 2012

Related U.S. Application Data

(60) Provisional application No. 61/453,474, filed on Mar. 16, 2011, provisional application No. 61/477,730, filed on Apr. 21, 2011, provisional application No. 61/508,621, filed on Jul. 16, 2011, provisional application No. 61/508,622, filed on Jul. 16, 2011.

(51) Int. Cl.
*H02J 1/00* (2006.01)
*H01M 16/00* (2006.01)
(Continued)

(52) U.S. Cl.
CPC ............. *H01M 16/00* (2013.01); *B60L 3/0046* (2013.01); *B60L 3/04* (2013.01); *B60L 11/005* (2013.01); *B60L 11/14* (2013.01); *B60L 11/1859* (2013.01); *B60L 11/1866* (2013.01); *B60L 11/1877* (2013.01); *B60L 11/1879* (2013.01);
(Continued)

(58) Field of Classification Search
CPC .................................. B60L 11/18; H02J 7/14
USPC .................... 307/109; 318/130; 320/166, 167
See application file for complete search history.

(56) References Cited

U.S. PATENT DOCUMENTS 4,047,088 A     9/1977  Himmler
4,962,462 A  *  10/1990  Fekete ........................... 700/297
(Continued)

FOREIGN PATENT DOCUMENTS

CN          101425612 A      5/2009
CN          201247804 Y      5/2009
(Continued)

OTHER PUBLICATIONS

International Search Report and Written Opinion for PCT No. PCT/US2012/029529 dated Aug. 14, 2012; 10 pages.
(Continued)

*Primary Examiner* — Rexford Barnie
*Assistant Examiner* — Elim Ortiz
(74) *Attorney, Agent, or Firm* — Fletcher Yoder P.C.

(57) ABSTRACT

System are described that include an energy storage device adapted to store and release energy and an ultracapacitor. The systems include a switching device coupled to the energy storage device to selectively connect and disconnect the energy storage device to a load, and a second switching device coupled to the ultracapacitor and adapted to connect and disconnect the ultracapacitor to the load. The systems may include a sensor adapted to sense the current draw at the load. The first switching device is activated to connect the energy storage device to the load when a rate of change of the current draw at the load is below a threshold, and the second switching device is activated to connect the ultracapacitor to the load when the rate of change of the current draw at the load is greater than or equal to the threshold.

20 Claims, 10 Drawing Sheets

(51) Int. Cl.

| | |
|---|---|
| *H01M 2/10* | (2006.01) |
| *H01M 10/052* | (2010.01) |
| *H01M 10/06* | (2006.01) |
| *H01M 10/42* | (2006.01) |
| *H01M 10/44* | (2006.01) |
| *H02J 7/14* | (2006.01) |
| *H02J 7/34* | (2006.01) |
| *B60L 3/00* | (2006.01) |
| *B60L 3/04* | (2006.01) |
| *B60L 11/00* | (2006.01) |
| *B60L 11/14* | (2006.01) |
| *B60L 11/18* | (2006.01) |
| *H02J 7/00* | (2006.01) |
| *H01G 11/14* | (2013.01) |

(52) U.S. Cl.
CPC .......... *H01M2/1072* (2013.01); *H01M 10/052* (2013.01); *H01M 10/06* (2013.01); *H01M 10/4257* (2013.01); *H01M 10/4264* (2013.01); *H01M 10/441* (2013.01); *H02J 7/0021* (2013.01); *H02J 7/0031* (2013.01); *H02J 7/1423* (2013.01); *H02J 7/345* (2013.01); *B60L 2210/10* (2013.01); *B60L 2240/547* (2013.01); *B60L 2240/549* (2013.01); *B60L 2240/662* (2013.01); *H01G 11/14* (2013.01); *H01M 2220/20* (2013.01); *Y02E 60/122* (2013.01); *Y02E 60/126* (2013.01); *Y02P 70/54* (2015.11); *Y02T 10/70* (2013.01); *Y02T 10/7005* (2013.01); *Y02T 10/7011* (2013.01); *Y02T 10/7016* (2013.01); *Y02T 10/7022* (2013.01); *Y02T 10/7055* (2013.01); *Y02T 10/7061* (2013.01); *Y02T 10/7077* (2013.01); *Y02T 10/7216* (2013.01); *Y02T 10/7291* (2013.01); *Y02T 90/16* (2013.01); *Y10T 29/49108* (2015.01); *Y10T 307/50* (2015.04)

(56) References Cited

U.S. PATENT DOCUMENTS

| | | |
|---|---|---|
| 5,041,776 A | 8/1991 | Shirata et al. |
| 5,146,095 A | 9/1992 | Tsuchiya et al. |
| 5,155,373 A | 10/1992 | Tsuchiya et al. |
| 5,155,374 A | 10/1992 | Shirata et al. |
| 5,311,112 A | 5/1994 | Creaco et al. |
| 5,642,696 A | 7/1997 | Matsui |
| 5,666,006 A | 9/1997 | Townsley |
| 5,710,699 A | 1/1998 | King et al. |
| 5,844,325 A | 12/1998 | Waugh et al. |
| 5,903,764 A | 5/1999 | Shyr et al. |
| 5,993,983 A | 11/1999 | Rozon |
| 6,057,666 A | 5/2000 | Dougherty et al. |
| 6,081,098 A | 6/2000 | Bertness et al. |
| 6,300,763 B1 | 10/2001 | Kwok |
| 6,313,608 B1 | 11/2001 | Varghese et al. |
| 6,325,035 B1 | 12/2001 | Codina et al. |
| 6,331,365 B1 | 12/2001 | King |
| 6,331,762 B1 | 12/2001 | Bertness |
| 6,346,794 B1 | 2/2002 | Odaohhara |
| 6,362,595 B1 | 3/2002 | Burke |
| 6,586,941 B2 | 7/2003 | Bertness et al. |
| 6,727,708 B1 | 4/2004 | Dougherty et al. |
| 6,744,237 B2 | 6/2004 | Kopf et al. |
| 6,777,913 B2 | 8/2004 | You |
| 6,871,151 B2 | 3/2005 | Bertness |
| 6,909,287 B2 | 6/2005 | Bertness |
| 6,930,485 B2 | 8/2005 | Bertness et al. |
| 7,035,084 B2 | 4/2006 | Kaneko et al. |
| 7,076,350 B2 | 7/2006 | Alvarez-Troncoso et al. |
| 7,126,341 B2 | 10/2006 | Bertness et al. |
| 7,134,415 B2 | 11/2006 | Burke et al. |
| 7,349,816 B2 | 3/2008 | Quint et al. |
| 7,360,615 B2 | 4/2008 | Salman et al. |
| 7,427,450 B2 | 9/2008 | Raiser |
| 7,436,080 B2 | 10/2008 | Hackle et al. |
| 7,494,729 B2 | 2/2009 | Odaohhara |
| 7,688,071 B2 | 3/2010 | Cheng et al. |
| 7,688,074 B2 | 3/2010 | Cox et al. |
| 7,696,716 B2 | 4/2010 | Siddiqui et al. |
| 7,806,095 B2 | 10/2010 | Cook et al. |
| 7,832,513 B2 | 11/2010 | Verbrugge et al. |
| 7,834,583 B2 | 11/2010 | Elder et al. |
| 7,969,040 B2 | 6/2011 | Conen et al. |
| 8,013,611 B2 | 9/2011 | Elder et al. |
| 2002/0024322 A1 | 2/2002 | Burke |
| 2002/0132164 A1 | 9/2002 | Kaneko et al. |
| 2002/0145404 A1 | 10/2002 | Dasgupta et al. |
| 2003/0094928 A1 | 5/2003 | Emori et al. |
| 2004/0053083 A1 | 3/2004 | Kobayashi et al. |
| 2004/0112320 A1 | 6/2004 | Bolz et al. |
| 2004/0164703 A1 | 8/2004 | Berels |
| 2004/0201365 A1 | 10/2004 | Dasgupta et al. |
| 2005/0035741 A1 | 2/2005 | Elder et al. |
| 2005/0052155 A1 | 3/2005 | Surig |
| 2005/0080641 A1 | 4/2005 | Ronning et al. |
| 2005/0137764 A1 | 6/2005 | Alvarez-Troncoso et al. |
| 2005/0224035 A1 | 10/2005 | Burke et al. |
| 2005/0247280 A1 | 11/2005 | Asada et al. |
| 2005/0279544 A1 | 12/2005 | Pott et al. |
| 2005/0284676 A1 | 12/2005 | King et al. |
| 2005/0285445 A1 | 12/2005 | Wruck et al. |
| 2006/0098390 A1 | 5/2006 | Ashtiani et al. |
| 2006/0127704 A1 | 6/2006 | Raiser |
| 2006/0186738 A1 | 8/2006 | Noguchi et al. |
| 2006/0201724 A1 | 9/2006 | Leblanc |
| 2007/0050108 A1 | 3/2007 | Larschan et al. |
| 2007/0090808 A1 | 4/2007 | McCabe et al. |
| 2007/0159007 A1* | 7/2007 | King et al. ........ 307/71 |
| 2007/0160901 A1 | 7/2007 | Kaun |
| 2008/0013224 A1 | 1/2008 | Kim et al. |
| 2008/0111508 A1 | 5/2008 | Dasgupta et al. |
| 2008/0113226 A1 | 5/2008 | Dasgupta et al. |
| 2009/0011327 A1 | 1/2009 | Okumura et al. |
| 2009/0021216 A1 | 1/2009 | Hills et al. |
| 2009/0050092 A1 | 2/2009 | Handa et al. |
| 2009/0056661 A1 | 3/2009 | Cook et al. |
| 2009/0317696 A1 | 12/2009 | Chang |
| 2009/0322286 A1 | 12/2009 | Chheda |
| 2010/0017045 A1 | 1/2010 | Nesler et al. |
| 2010/0019737 A1* | 1/2010 | Leboeuf .......... 320/167 |
| 2010/0133025 A1* | 6/2010 | Flett ............ 180/65.22 |
| 2010/0233523 A1 | 9/2010 | Jo et al. |
| 2010/0237872 A1* | 9/2010 | Kang et al. ....... 324/429 |
| 2010/0285702 A1 | 11/2010 | Platon |
| 2011/0001353 A1 | 1/2011 | Emerson et al. |
| 2011/0031046 A1 | 2/2011 | Zolman et al. |
| 2011/0198929 A1 | 8/2011 | Zhu et al. |
| 2011/0202216 A1 | 8/2011 | Thai-Tang et al. |
| 2011/0238257 A1 | 9/2011 | Tarnowsky et al. |
| 2013/0120897 A1* | 5/2013 | Lin et al. ......... 361/234 |

FOREIGN PATENT DOCUMENTS

| | | |
|---|---|---|
| CN | 101699590 A | 4/2010 |
| CN | 101719557 A | 6/2010 |
| DE | 20311494 U1 | 10/2003 |
| DE | 102006048872 A1 | 5/2008 |
| FR | 2910191 A1 | 6/2008 |
| JP | 2011009128 A | 1/2011 |
| JP | 2011071112 A | 4/2011 |
| WO | 8401475 | 4/1984 |
| WO | 2006045016 A2 | 4/2006 |
| WO | 2010091583 A1 | 8/2010 |

OTHER PUBLICATIONS

Patel, Prachi; "A Battery-Ultracapacitor Hybrid"; A device for power tools may also help regenerative braking; Technology Review published by MIT; Monday, Jan. 10, 2011, 1-2 pgs.

(56) References Cited

OTHER PUBLICATIONS

Lamonica, Martin; "Hybrid Storage Melds Battery, Ultracapacitor"; Green Tech—CNET News—CBS Interactive; pp. 1-2.
Bullis, Kevin; "Ultracaps Could Boos Hybrid Efficiency"; Technology Review—published by MIT; Thursday, Aug. 20, 2009; pp. 1-2.
Burke, Andrew F.; "Batteries and Ultracapacitors for Electric, Hybrid, and Fuel Cell Vehicles"; Simulations indicate that fuel-efficient hybrid-electric vehicles can be designed using either batteries or ultracapacitors and that the decision between the two technologies is dependent on their cost and useful life; IEEE; vol. 95, No. 4, Apr. 2007; pp. 806-820.
CN Office Action dated Jul. 3, 2015.

* cited by examiner

ENERGY SOURCE SYSTEM HAVING MULTIPLE ENERGY STORAGE DEVICES

CROSS REFERENCE TO RELATED APPLICATIONS

This application is a Non-Provisional Application of U.S. Provisional Patent Application No. 61/453,474, entitled "Combined Battery and Super Capacitor Systems for Vehicle Applications," filed Mar. 16, 2011, and U.S. Provisional Patent Application No. 61/508,621, entitled "System for Storage of Charge and Energy with an Integrated Controller," filed Jul. 16, 2011, and U.S. Provisional Patent Application No. 61/477,730, entitled "Multiple Battery System for Vehicle Applications," filed Apr. 21, 2011, and U.S. Provisional Patent Application No. 61/508,622, entitled "Differential State of Charge Battery for Improved Charging Capability," filed Jul. 16, 2011, which are herein incorporated by reference.

The present patent application is generally related to the following co-pending patent applications, which are hereby incorporated into the present application by reference: U.S. application Ser. No. 13/422,246, entitled "Energy Source Systems Having Devices with Differential States of Charge", filed by Ou Mao et al. on Mar. 16, 2012; U.S. application Ser. No. 13/422,326, entitled "Systems and Methods for Controlling Multiple Storage Devices", filed by Brian C. Sisk et al. on Mar. 16, 2012; U.S. application Ser. No. 13/422,421, entitled "Energy Source Devices and Systems Having a Battery and An Ultracapacitor", filed by Perry M Wyatt et al. on Mar. 16, 2012; and U.S. application Ser. No. 13/422,621, entitled "Systems and Methods for Overcharge Protection and Charge Balance in Combined Energy Source Systems", filed by Junwei Jiang et al. on Mar. 16, 2012.

FIELD

The presently disclosed embodiments relate generally to energy source systems capable of providing energy for a downstream application. More specifically, presently disclosed embodiments relate to energy source systems including combined battery and ultracapacitor devices for vehicle applications. Still more specifically, presently disclosed embodiments relate to a combined battery and ultracapacitor system that meets all of the electrical demands for vehicle loads, including starting, lighting and ignition, in a package that occupies less space and with less weight than conventional vehicle battery systems.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

It is generally known to provide typical Pb-acid batteries for starting, lighting, and ignition (SLI) applications in a vehicle. Such Pb-acid batteries usually have a capacity of about 70 Ah and a voltage of about 12V. The weight of such Pb-acid batteries is typically about 21 kg and the energy density is often about 40 Wh/kg. One performance requirement for such Pb-acid batteries for SLI applications is referred to as the "cold cranking current," which is about 700 Ah at (−)18° C. Such a high cold cranking current requirement is for the vehicle engine starting purpose, for delivery within a few seconds, especially under cold weather conditions. However, such known Pb-acid batteries, in order to meet the cold cranking current requirement, are sized such that they tend to occupy a relatively large amount of space, and add a significant amount of weight to the vehicle platform.

Another drawback with conventional battery systems is the issue of poor charge acceptance. That is, in certain instances, the battery may not be capable of handling the high charge current, which may have an undesirable impact on the vehicle's energy regeneration capability. Accordingly, it would be desirable to provide one or more advanced energy source systems that are capable of efficiently meeting the cold cranking current requirements for engine starting while being packaged in a smaller and lighter device. Further, it would also be desirable to provide one or more advanced energy source systems that are adaptable for use with components associated with start-stop technology or components of the vehicle (e.g. to permit stopping of the vehicle engine during standstill periods and restart upon demand by the driver), or with components associated with mild-hybrid technology or components of the vehicle (e.g. to provide motor-driven boost or assist in accelerating a vehicle to a cruising speed), and electrical vehicle applications, and in a voltage range of approximately 10-400V, and more particularly within a range of approximately 10-100V.

SUMMARY

In one embodiment, a system includes an energy storage device adapted to store and release energy and an ultracapacitor. The system also includes a first switching device coupled to the energy storage device and adapted to selectively connect and disconnect the energy storage device to a load and a second switching device coupled to the ultracapacitor and adapted to selectively connect and disconnect the ultracapacitor to the load. The system also includes a current sensor adapted to sense the current draw at the load. The first switching device is adapted to be activated to connect the energy storage device to the load when a rate of change of the current draw at the load is below a preset threshold, and the second switching device is adapted to be activated to connect the ultracapacitor to the load when the rate of change of the current draw at the load is greater than or equal to the preset threshold.

In another embodiment, a method includes monitoring a parameter corresponding to a demand present at a load and determining, based on a rate of change of the monitored parameter over time, whether the rate of change of the monitored parameter is greater than or equal to a preset threshold. The method also includes controlling a first switch to couple a battery to the load when the rate of change of the monitored parameter is not greater than or equal to the preset threshold. Further, the method includes controlling a second switch to couple an ultracapacitor to the load when the rate of change of the monitored parameter is greater than or equal to the preset threshold.

In another embodiment, a system includes a battery having one or more electrochemical cells coupled in series with one another and an ultracapacitor. The system also includes a first switching device coupled to the battery and adapted to selectively connect and disconnect the battery to a load and a second switching device coupled to the ultracapacitor and adapted to selectively connect and disconnect the ultracapacitor to the load. The system also includes a direct current to direct current (DC-DC) converter adapted to electrically couple the battery to the ultracapacitor and a sensing system adapted to sense an operational parameter of the battery, an operational parameter of the ultracapacitor, and a load parameter. Further, the system includes a controller coupled to the first switching device, the second switching device, and the DC-DC converter and adapted to determine, based on the sensed operational and load parameters, an energy flow between the battery, the ultracapacitor, the DC-DC converter, and the load and to control the first switching device, the second switching device, and the DC-DC converter to achieve the determined energy flow.

In another embodiment, a method includes detecting an engine start signal and determining, based on a received input, if the energy stored in a battery is sufficient to start an internal combustion engine associated with an electromechanical vehicle. The method also includes controlling a direct current to direct current (DC-DC) converter to transfer energy from the battery to an ultracapacitor when the energy stored in the battery is not sufficient to start the internal combustion engine. Further, the method includes controlling a switch coupled to the ultracapacitor to electrically couple the ultracapacitor to the internal combustion engine to enable a flow of energy from the ultracapacitor to the internal combustion engine to start the internal combustion energy when the energy stored in the battery is not sufficient to start the internal combustion engine.

In another embodiment, a controller is adapted to detect an engine start signal and to determine, based on a received input, if the energy stored in a battery is sufficient to start an internal combustion engine associated with an electromechanical vehicle. The controller is also adapted to control a direct current to direct current (DC-DC) converter to transfer energy from the battery to an ultracapacitor when the energy stored in the battery is not sufficient to start the internal combustion engine. Further, the controller is adapted to control a switch coupled to the ultracapacitor to electrically couple the ultracapacitor to the internal combustion engine to enable a flow of energy from the ultracapacitor to the internal combustion engine to start the internal combustion energy when the energy stored in the battery is not sufficient to start the internal combustion engine.

DRAWINGS

The disclosure will become more fully understood from the following detailed description, taken in conjunction with the accompanying figures, wherein like reference numerals refer to like elements, in which.

DETAILED DESCRIPTION

In accordance with presently disclosed embodiments, provided herein are advanced battery and ultracapacitor systems having overcharge protection and charge balancing capabilities. In some embodiments, the high power discharge capability of the ultracapacitors may be utilized to meet the cold cranking current requirements for a vehicle engine start, and a smaller and lighter battery may be utilized to provide the energy for other vehicle electrical applications. According to any of the illustrated embodiments, the vehicle applications may include one or more of internal combustion engines, hybrid, micro-hybrid, start-stop and electric vehicle applications, and may include voltage applications within the range of approximately 10V to approximately 400V, and more particularly, within a range of approximately 10V and approximately 100V. Although only a certain number of battery types have been described in the illustrated embodiments by way of example, any of a wide variety of other battery types and chemistries may be adapted for use with ultracapacitors for use in providing a smaller and/or lighter electrical power supply for a wide variety of vehicle applications. Accordingly, all such variations are intended to be within the scope of this disclosure.

One type of battery technology suitable for use with the systems described herein in Li-ion technology. The Li-ion battery technology provides a relatively high energy density up to about 200 Wh/kg, which is generally about five times that of the Pb-acid battery energy density. Thus, there are benefits for using Li-ion battery technology in some embodiments to replace the conventional Pb-acid battery for SLI applications in vehicles, such as (by way of example, and not limited to) elimination of Pb toxic compounds, lighter weight, and smaller space requirements. However, the cold cranking performance of Li-ion technology, by itself, is generally understood to limit the use of Li-ion technology in such applications. A typical Li-ion battery discharge rate at (−)18° C. is generally about a 2 C rate, where 2 C rate represents a discharge current of about 140 A for 70 Ah batteries, which is lower than the typical Pb-acid battery cold cranking performance (around 10 C rate).

Figure 1:
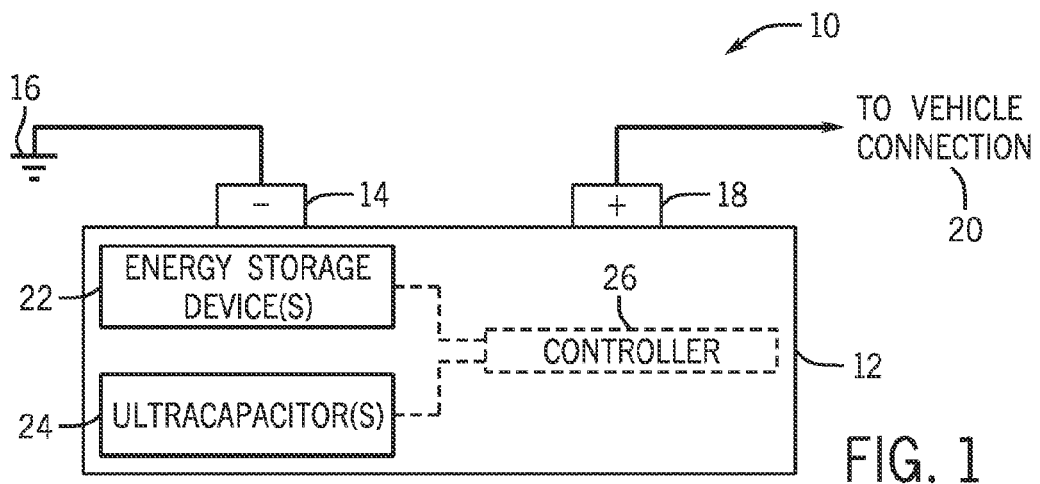
FIG. 1 illustrates an electrical supply system having a negative terminal and a positive terminal disposed on a housing that encloses an energy storage device and an ultracapacitor in accordance with an embodiment.

Turning now to the drawings, FIG. 1 illustrates an electrical supply system 10 having a housing 12 with a negative terminal 14 that is connected to ground 16 and a positive terminal 18 that is capable of being coupled to an implementation-specific vehicle connection 20, such as a switch, a starter motor, etc. As shown, an energy storage device 22 and an ultracapacitor 24 are provided within the housing 12. That is, a single housing 12 having two terminals 14 and 18 encloses both the energy storage device 22 and the ultracapacitor 24. The foregoing feature may enable the electrical supply system 10 to be dimensioned in such a way that enables the system 10 to be utilized to replace a variety of battery devices having standardized dimensions, for example, a standard 12V battery. As such, it should be noted that the housing 12 and the configuration of the terminals 14 and 18 may be susceptible to a variety of implementation-specific variations in size, shape, and placement, as discussed in more detail below. For example, in certain embodiments the system may be designed such that the housing or enclosure is configured to permit simple and direct replacement of existing battery systems, such as conventional vehicular batteries. As such, the enclosure may conform to standard sizing and form factors, particularly relating to the length, width, and height of the enclosure, the placement of terminals, the configuration of the terminals, the placement and dimensions of features intended to hold the battery system in place, and so forth. Where desired, the actual enclosure may be somewhat smaller than such conventional form factors, and adapters, shims and similar structures may be used to allow for such replacement. Such adapters and structures may also allow for the use of enclosures of irregular or non-standard shapes. In either case, there may be need for little or no change in the supporting and interfacing structures of the vehicle or other application in which the system is placed as compared to current structures.

It should be noted that, as will be appreciated by those skilled in the art, distinctions exist between "charge" and "energy", both physically and in terms of unitary analysis. In general, charge will be stored and energy converted during use. However, in the present context, the two terms will often be used somewhat interchangeably. Thus, at times reference is made to "charge storage" or to "the flow of charge", or to similar handling of "energy". This use should not be interpreted as technically inaccurate or limiting insomuch as the batteries, ultracapacitors, and other devices and components may be said, in common parlance, to function as either energy storage devices or charge storage devices, and sometimes as either or both.

Further, as shown in the illustrated embodiment, the housing 12 also encloses a controller 26 that is coupled to the energy storage device 22 and the ultracapacitor 24 and may control operation of the multiple device system. It should be noted that the controller 26 shown in FIG. 1 may be any controller that is suitable for use with a multiple device system. However, in some presently contemplated embodiments, the energy storage device 22 and the ultracapacitor 24 may be controlled by a multiple device controller such as the controller described in the co-pending application entitled "SYSTEMS AND METHODS FOR CONTROLLING MULTIPLE STORAGE DEVICES," which is hereby incorporated by reference, as previously mentioned.

Figure 2:
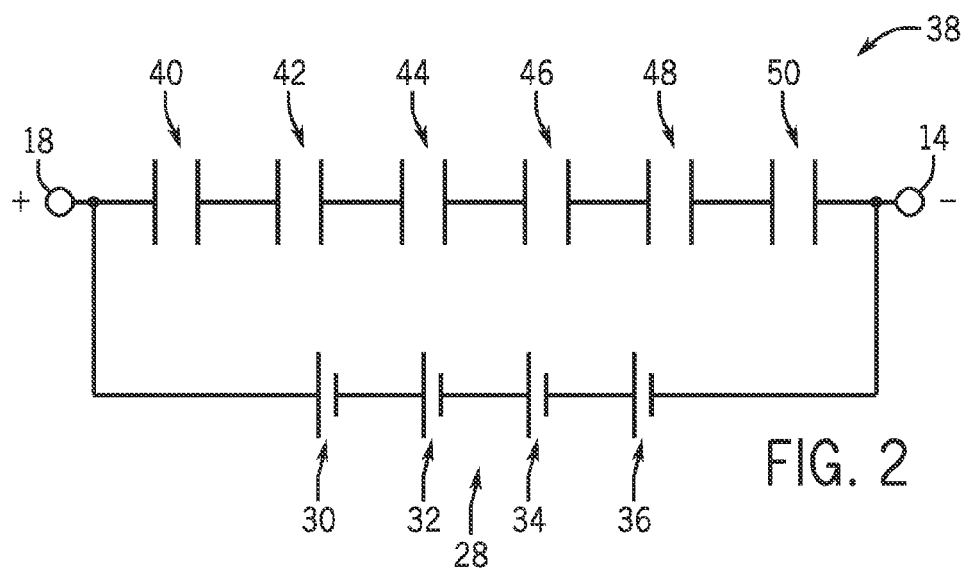
FIG. 2 is a schematic representation of a battery and ultracapacitor design for vehicle applications according to one embodiment of the systems described herein.

Further, it should be noted that the energy storage device 22 and the ultracapacitor 24 in FIG. 1 are merely illustrative, and each device may include one or more devices in other embodiments. For example, referring generally to the embodiment illustrated in FIG. 2, a combination of Li-ion technology with an ultracapacitor pack may provide an improved vehicle electrical power system, since the high power ultracapacitor can quickly discharge with high power to start the vehicle engine (e.g., within approximately 2 or 3 seconds). More specifically, FIG. 2 illustrates one embodiment of the design of the combination of a Li-ion battery 28 having four cells 30, 32, 34, and 36 (each with a capacity of approximately 15 Ah) and a bank 38 of ultracapacitors 40, 42, 44, 46, 48, and 50 (each with a capacity of about 2000 Farads and 2.7 VDC). In one embodiment, the average voltage of each Li-ion battery cell (LiFePO4/graphite) is about 3.3V, and thus, the four cell pack in series provides a voltage of about 13.2V. The six ultracapacitors 40, 42, 44, 46, 48, and 50 in series provide an average voltage of about 12V.

Further, during cold cranking current requirements, the ultracapacitor pack 38 can supply a maximum current of about 2,000 Amps within 2 seconds at cold temperatures around (−)18° C., which is generally understood to be sufficient to start a vehicle engine. Further, the total weight of such a four cell Li-ion battery and six ultracapacitor pack is about seven 7 kg, compared to a weight of about 21 kg for a Pb-acid battery with a capacity of about 70 Ah for vehicle starting, lighting, and ignition (SLI) applications. The maximum power for such a Li-ion and ultracapacitor system reaches to about 46 kW, compared to about 5.6 kW for the Pb-acid battery pack (70 Ah) at low temperatures of about (−)18° C.

Figure 3:
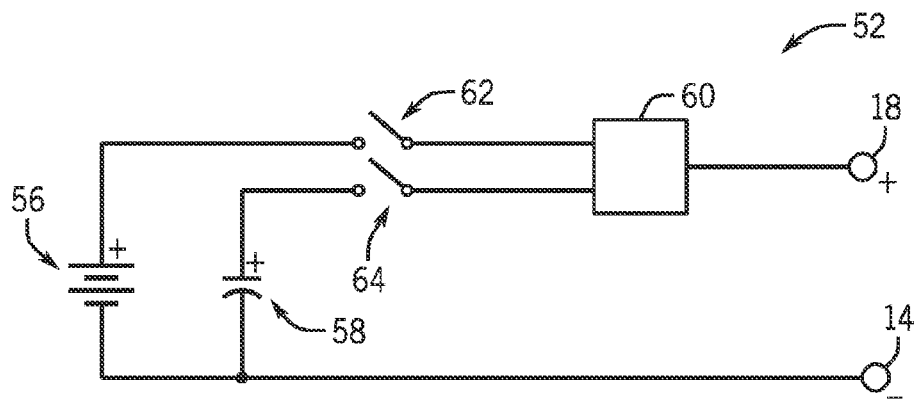
FIG. 3 illustrates an embodiment of a circuit that may be utilized to electrically couple an energy storage device and an ultracapacitor within a housing having two terminals in accordance with an embodiment.
Figure 4:
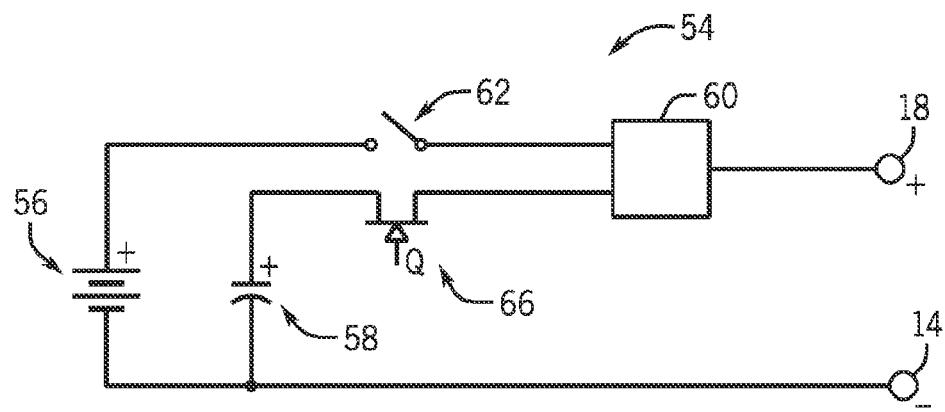
FIG. 4 illustrates an embodiment of a circuit that may be utilized to electrically couple an energy storage device and an ultracapacitor utilizing at least one variable resistance device in accordance with an embodiment.

FIGS. 3 and 4 illustrate additional embodiments of circuits 52 and 54 that may be utilized to electrically couple an embodiment of the energy storage device 22 and an embodiment of the ultracapacitor 24 for packaging in the housing 12 having two terminals 14 and 18. Specifically, in the illustrated embodiments, a battery 56 and a capacitor 58, which may be an ultracapacitor in certain embodiments, are coupled to a current sensor 60. In the embodiment of FIG. 3, the battery 56 is electrically coupled to the positive terminal 18 via a first switch 62, and the capacitor 58 is electrically coupled to the positive terminal 18 via a second switch 64. However, it should be noted that the switches 62 and 64 illustrated in FIG. 3 may, in other embodiments, be variable resistance devices capable of feathering in and out the associated device, for example, as dictated by the controller 26. For instance, in the embodiment of FIG. 4, the second switch 64 is a field-effect transistor (FET) 66 capable of being controlled to connect and disconnect the capacitor 58 to a load present at the positive terminal 18 in a variable manner. Additionally, it should be noted that in other embodiments, the first switch 62 may also be a variable resistance device, such as a FET.

During operation, the current sensor 60 senses the current draw present at the load, thus enabling the controller 26 to determine, based on the sensed level, the nature of the load that is present. For example, the current sensor 60 may sense a level that corresponds to an accessory drain or alternatively, the current sensor 60 may sense a level that corresponds to a power draw. The controller 26 may then utilize the sensed current level to determine which of the battery 56 and the capacitor 58 should be activated, for example, via closing of the switches 62 and 64. For example, if an accessory drain from a vehicle is detected at the load, the switch 62 may be closed, thus enabling the battery 56 to meet the accessory demand. For further example, if a power draw, such as a draw associated with starting of an internal combustion engine, is detected, the switch 64 may be closed to enable the capacitor 58 to meet the power draw. Still further, in some embodiments, the controller may control the FET 66 and a FET coupled to the battery 56 such that the load is met by a combination of power delivered from the devices 56 and 58. Accordingly, presently disclosed embodiments may provide for sensing a parameter of the load and intelligently controlling the devices 56 and 58 to meet the demand present at the load.

Figure 5:
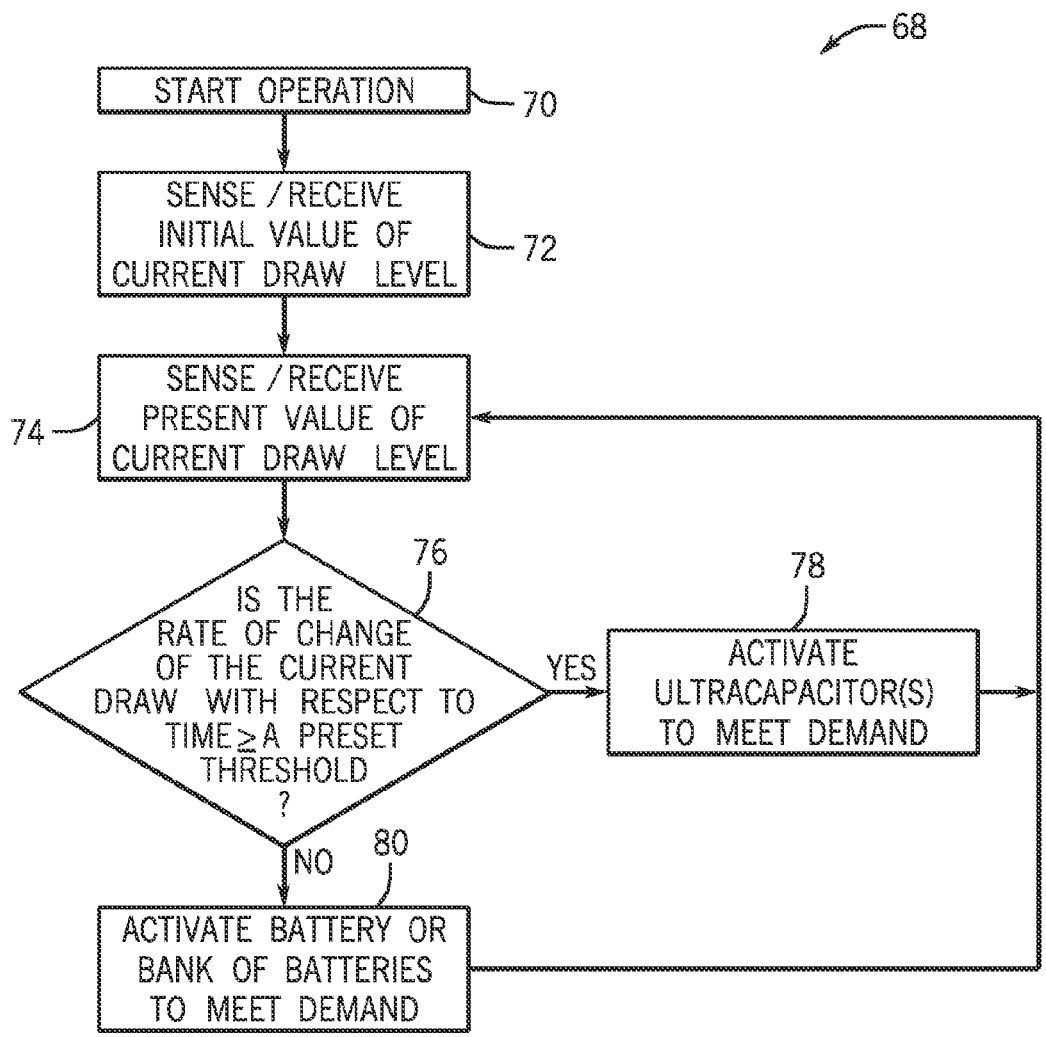
FIG. 5 illustrates an embodiment of a method that may be implemented by a controller to utilize sensed feedback to intelligently control operation of a multiple device system in accordance with an embodiment.

FIG. 5 illustrates an embodiment of a method 68 that may be implemented by, for example, the controller 26, to utilize the sensed feedback to intelligently control operation of the multiple device system. Once the operation is started (block 70), the controller 26 receives an initial value for the current draw level (block 72), for example, from the current sensor 60, and then receives a present value of the current draw at a later time point (block 74). In this embodiment, the method 68 proceeds with an inquiry as to whether the rate of change of the current draw with respect to time is greater than or equal to a preset threshold (block 76). If the rate of change of the sensed current meets or exceeds the given threshold, the controller 26 activates the capacitor 58 to meet the demand (block 78). For example, the controller may utilize switch 64 to couple the capacitor 58 to the load present at the positive terminal 18. However, if the rate of change of the sensed current is below the preset threshold, the battery 56 is activated to meet the demand at the load (block 80).

In this way, the rate of change of sensed current over time may be utilized to determine which of the devices 56 and 58 are utilized to meet the demand of the load. It should be noted that although the sensor in the illustrated embodiment is a current sensor, in other embodiments, any suitable sensor or combination of sensors capable of sensing a load parameter may be utilized. Additionally, any suitable indicator, not limited to the rate of change of current with respect to time, may be utilized to determine which device is activated to meet the demand at the load. Still further, in certain embodiments, a variety of thresholds or inquiries may be utilized to determine which portion of the load should be met by each device. That is, in certain embodiments, the controller may utilize additional logic to determine an appropriate shared distribution of the load between the devices.

Figure 6:
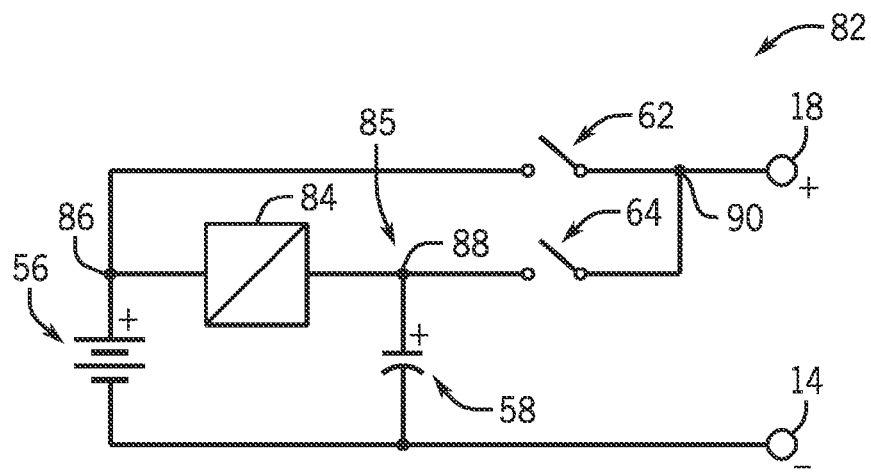
FIG. 6 illustrates an embodiment of a circuit that may be utilized to electrically couple an energy storage device, an ultracapacitor, and a DC/DC converter within a housing having two terminals in accordance with an embodiment.

FIG. 6 illustrates an additional embodiment of a circuit 82 that may be utilized to electrically couple the battery 56 and the capacitor 58 to the load present at the positive terminal 18. In this embodiment, as before, the switches 62 and 64 couple the battery 56 and the capacitor 58, respectively, to the positive terminal 18. However, as shown, the circuit 82 includes a direct current to direct current (DC/DC) converter that electrically couples the battery 56 and the capacitor 58. Further, a sensing system 85 includes a battery voltage sensor 86, a capacitor voltage sensor 88, and a net voltage sensor 90 capable of measuring the voltage of the battery, the voltage of the capacitor, and the net voltage, respectively, throughout operation of the circuit 82.

During operation of the circuit 82, the sensing system 85 may be utilized to measure voltage levels at a variety of locations in the circuit 82, thus enabling the controller 26 to acquire information regarding both load requirements as well as the quantity of energy each of the devices 56 and 58 is capable of providing. Therefore, based on the information received from the sensing system 85, the controller 26 may control the switches 62 and 64 and the DC/DC converter 84 to meet the demand at the load in accordance with energy available from each of the devices 56 and 58 at any given operational time point. Further, it should be noted that, as before, the switches 62 and 64 may be variable devices, such as FETs, that enable the controller to feather in and out each of the devices as appropriate.

In one embodiment, the circuit 82 of FIG. 6 may be packaged, for example, within housing 12, with the controller 26 and utilized in place of a traditional vehicle battery. In such an embodiment, the circuit 82, operated under control of the controller 26, may be utilized to reduce or eliminate the likelihood that the vehicle in which the device 10 is placed is unable to start when the voltage of the battery 56 is drained below a level sufficient to start, for example, the internal combustion engine of the vehicle. Here again, it should be noted that, as discussed in more detail below, the housing 12 and the configuration of the terminals 14 and 18 may be dimensioned and configured for the vehicle in which the device 10 is intended to be utilized.

Figure 7:
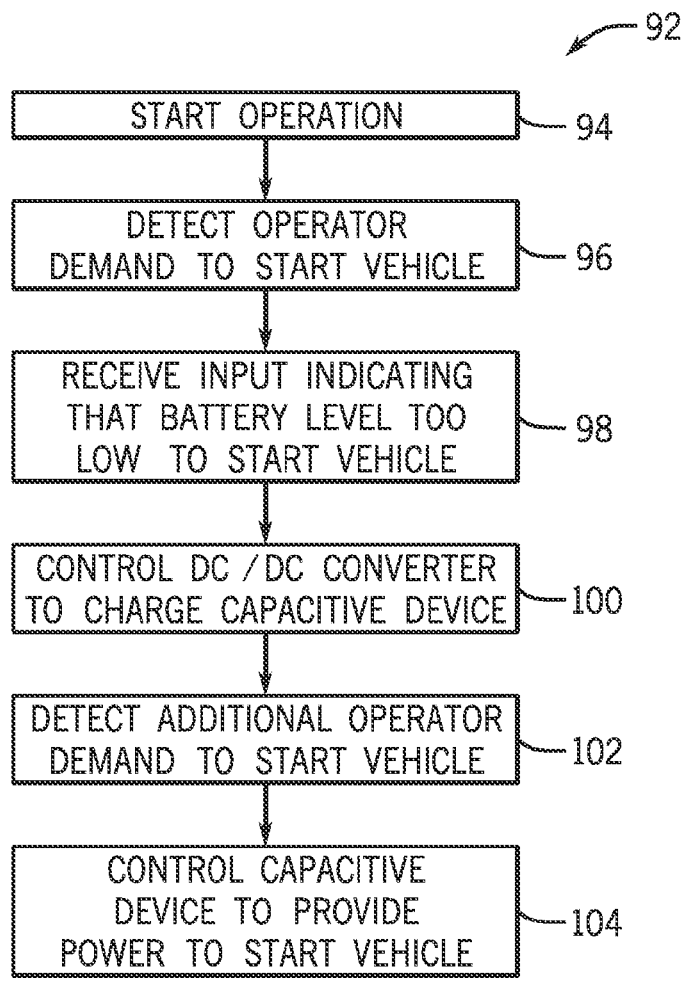
FIG. 7 illustrates an embodiment of a safe start method that may be implemented by a controller to control a battery and an ultracapacitor in accordance with an embodiment.

FIG. 7 illustrates an embodiment of a method 92 that may be implemented by the controller 26 to ensure that a vehicle with which the circuit 82 is associated is started if possible given the energy available in the devices 56 and 58. Once the operation is started (block 94), an operator demand to start the vehicle is detected (block 96). For example, the operator may insert and turn a key in a console of the vehicle, press a button to start the vehicle, and so forth, depending on the specific vehicle type. In some embodiments, the battery 56 may be designated as the primary energy source that is to be utilized for routine vehicle starting events. In such embodiments, at certain times, the voltage of the battery may be too low to support an engine start event, and the controller 26 receives an input indicating that the available voltage from the battery is insufficient to meet the operator demand to start the vehicle (block 98).

In such instances, presently disclosed embodiments provide for a reduced or prevented likelihood that battery drainage will prohibit the vehicle from being started. More specifically, the method 92 includes the step of controlling the DC/DC converter 84 to utilize the available voltage in the battery 56 to charge the capacitor 58 (block 100). That is, although the voltage in the battery 56 may be insufficient to start the vehicle, the available voltage may be sufficient to charge the capacitor 58. Once the vehicle fails to start upon the operator's first request, the operator may again attempt to start the vehicle, and the controller 26 detects this demand (block 102). Since the capacitor 58 was charged during the time lapse between the first start attempt and the second start attempt, the capacitor 58 may be utilized to start the vehicle (block 104), thus fulfilling the operator request. In this way, the circuit 82 may be controlled to reduce or prevent the likelihood that the vehicle will not be able to start when the battery voltage is low, thus offering advantages over traditional systems that may utilize a battery in place of the multiple device system 10.

Figure 8:
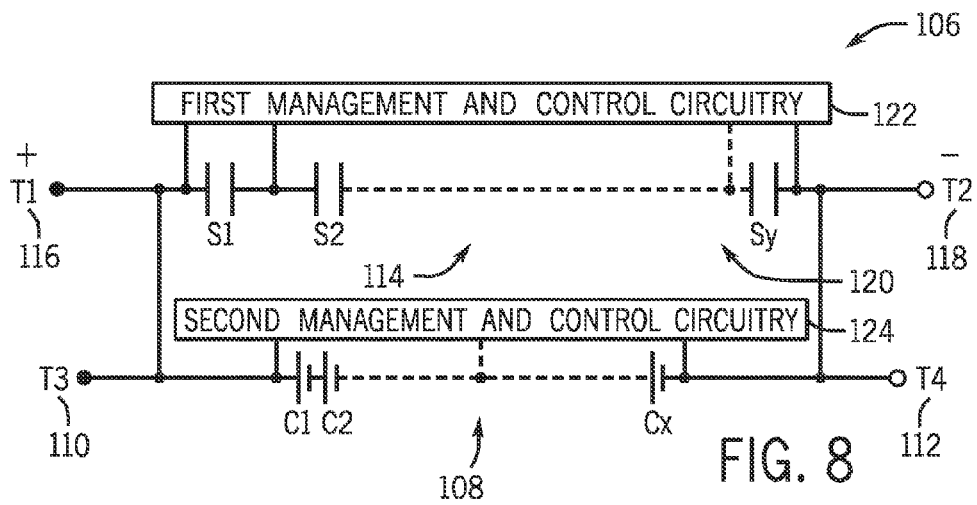
FIG. 8 is a schematic representation of a battery and ultracapacitor design for vehicle applications according to a first embodiment of the systems described herein.

FIGS. 8-15 illustrate additional embodiments of circuits including various combinations of batteries, ultracapacitors, overcharge protection circuits, and charge balancing circuits. Specifically, FIG. 8 illustrates an embodiment of a combined battery and ultracapacitor system 106 for vehicle applications with recharge capability. The system 106 as shown in FIG. 8 includes a battery 108 having a number of cells (or battery units) C1, C2, . . . CX that are connected in series and to terminals T3 (110) and T4 (112), which are connected to the alternator of the vehicle's electrical system for maintaining the charge on the battery cells 108 (and providing a power source to other electrical loads of the vehicle). An ultracapacitor pack 114 is shown connected in parallel with the battery 108 and has individual ultracapacitors S1, S2, . . . SY connected in series with one another and to terminals T1 (116) and T2 (118), which are connected to the engine-starting portion of the vehicle's electrical system for providing relatively short and high current for starting the vehicle. The number of ultracapacitors and the capacity of the ultracapacitors are selected so that the total voltage of the ultracapacitors 114 substantially matches the total voltage of the series of cells in the battery 108. The system 106 also includes a management and control system 120 that permits the battery 108 to quickly recharge the ultracapacitors 114 following discharge (e.g. engine starts).

According to the illustrated embodiment, the management and control system 120 includes first management and control circuitry 122 that is associated with the ultracapacitors 114, as well as second management and control circuitry 124 that is associated with the battery 108. During operation, the management and control system 120 operates to provide overcharge protection and charge balance for the ultracapacitors 114. As such, it should be noted that the first control circuitry 122 and the second control circuitry 124 may communicate with one another, for example, via a wired or wireless connection, to coordinate operation of the battery 108 and the ultracapacitors 114. Further, in certain embodiments, the management and control system 120 monitors, controls, and balances the battery 108 and the ultracapacitors 114. As such, during operation, the functions of the management and control system 120 may include, but are not limited to monitoring parameters of the battery and ultracapacitors (e.g., voltage, temperature, state of charge/discharge, state of health, current, etc.), computing desired parameters (e.g., maximum charge/discharge current, total energy delivery, total operating time, etc.), communicating with system components (e.g., via CAN bus, wireless communication, etc.), providing protection capabilities (e.g., over-current, overcharge/discharge voltage, over/under temperature, etc.), and balancing to enable the function of energy storage system.

More specifically, during operation, the control circuitry 122 and 124 controls the flow of energy between the battery 108 and the ultracapacitors 114 to permit current flow only in the direction from the battery 108 to the ultracapacitors 114.

Further, the first control circuitry 122 is coupled to each ultracapacitor to provide overcharge protection and balancing of the charge among the ultracapacitors as current flows from the battery 108 to the ultracapacitors 114. For example, in some embodiments, the control circuitry 122 may control the current flow such that as the flow from the battery 108 reaches each ultracapacitor (from S1 to Sy), current is directed first to S1, then to S2 and so on, until the current reaches Sy. In this way, when each ultracapacitor reaches its required voltage level, the current from the battery 108 will bypass that ultracapacitor to balance with the other ultracapacitors in the pack 114. According to other embodiments, other components or devices may be used to balance the charging of the ultracapacitors; all such variations are intended to be within the scope of this disclosure.

Figure 9:
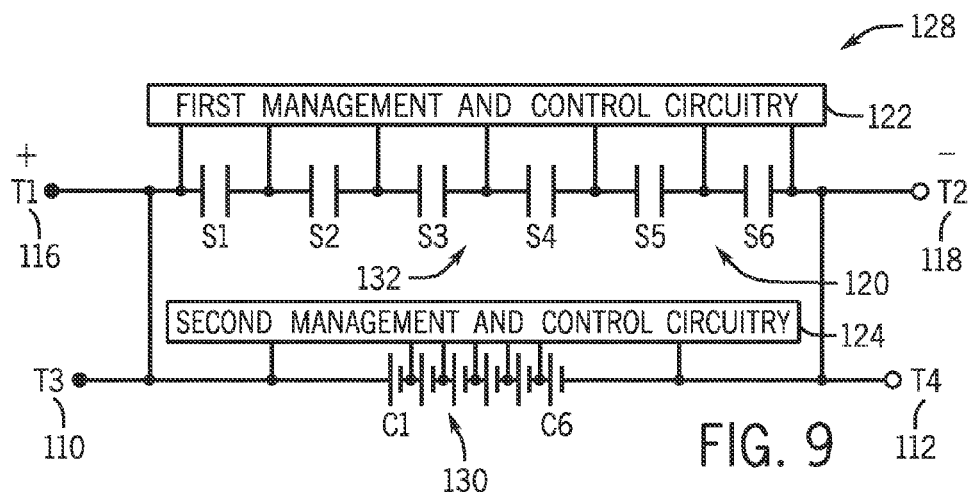
FIG. 9 is a schematic representation of a battery and ultracapacitor design for vehicle applications according to a second embodiment of the systems described herein.

FIG. 9 illustrates a combined 12V Pb-acid battery and ultracapacitor system 128 for vehicle applications with recharge capability, according to a presently disclosed embodiment. The system 128, as shown in FIG. 9 includes a battery 130 having a number of cells (or battery units) shown as six cells C1, C2, C3, C4, C5 and C6 that are connected in series with one another and to terminals T3 (110) and T4 (112), which are connected to the alternator of the vehicle's electrical system for maintaining the charge on the battery cells (and providing a power source to other electrical loads of the vehicle). An ultracapacitor pack 132 is shown connected in parallel with the battery 130 and has six individual ultracapacitors S1, S2, S3, S4, S5 and S6 connected in series with one another and to terminals T1 (116) and T2 (118), which are connected to the engine-starting portion of the vehicle's electrical system for providing relatively short and high current for starting the vehicle. The number of ultracapacitors and the capacity of the ultracapacitors are selected so that the total voltage of the ultracapacitors 132 substantially matches the total voltage of the series of cells in the battery 130. According to the embodiment of FIG. 9, each of the six Pb-acid cells has a voltage of approximately 2V, so that the total voltage of the battery is about 12V. Also, each of the six ultracapacitors has an average voltage of about 1.9V (but may be within the range of about 1V-2.8V). Accordingly, six ultracapacitors are selected so that the total voltage approximately matches the voltage of the Pb-acid battery.

The system of FIG. 9 also includes the management and control system 120 that permits the Pb-acid battery 130 to quickly recharge the six ultracapacitors 132 following discharge (e.g. engine starts). As before, in the illustrated embodiment, the management and control system 120 includes the first management and control circuitry 122 and the second management and control circuitry 124. During operation, the management and control system 120 operates to provide overcharge protection and charge balance for the ultracapacitors 132. More specifically, during operation, the control circuitry 122 and 124 controls the flow of energy between the Pb-acid battery 130 and the ultracapacitors 132 to permit current flow only in the direction from the Pb-acid battery 130 to the ultracapacitors 132.

Further, the first control circuitry 122 is coupled to each ultracapacitor to provide overcharge protection and balancing of the charge among the ultracapacitors as current flows from the Pb-acid battery 130 to the ultracapacitors 132. For example, in some embodiments, the control circuitry 122 may control the current flow such that as the flow from the Pb-acid battery 130 reaches each ultracapacitor (from S1 to S6), current is directed first to S1, then to S2 and so on, until the current reaches S6. In this way, when each ultracapacitor reaches its required voltage level, the current from the Pb-acid battery 130 will bypass that ultracapacitor to balance with the other ultracapacitors in the pack 132. According to other embodiments, other components or devices may be used to balance the charging of the ultracapacitors; all such variations are intended to be within the scope of this disclosure.

Figure 10:
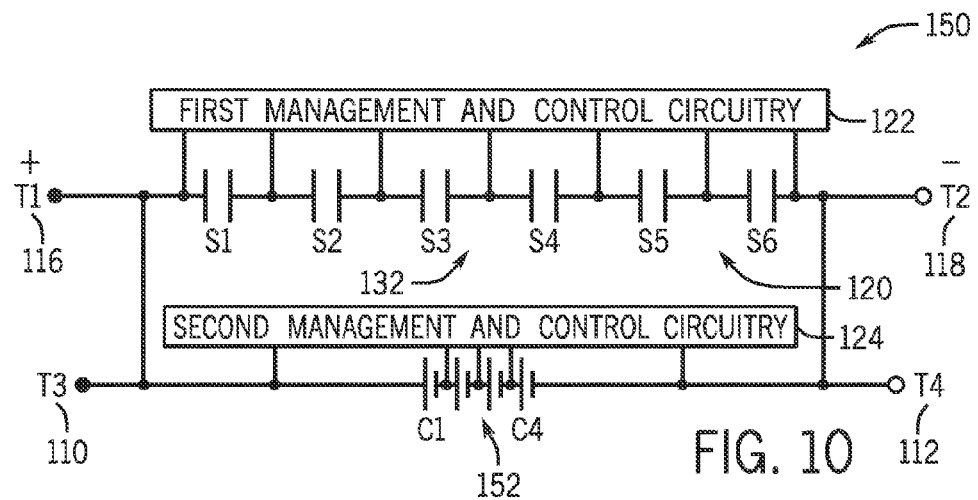
FIG. 10 is a schematic representation of a battery and ultracapacitor design for vehicle applications according to a third embodiment of the systems described herein.

Referring to FIG. 10, a combined 13V Li-ion (LiFePO4 cathode/carbon anode) battery and ultracapacitor system 150 for vehicle applications with recharge capability is shown according to a presently disclosed embodiment. The system 150, as shown in FIG. 10, includes a battery 152 having a number of cells (or battery units) shown as four cells C1-C4 that are connected in series with one another and to terminals T3 (110) and T4 (112), which are connected to the alternator of the vehicle's electrical system for maintaining the charge on the battery cells 152 (and providing a power source to other electrical loads of the vehicle). A ultracapacitor pack 132 is shown connected in parallel with the battery 152 and has six individual ultracapacitors S1, S2, S3, S4, S5 and S6 connected in series with one another and to terminals T1 (116) and T2 (118), which are connected to the engine-starting portion of the vehicle's electrical system for providing relatively short and high current for starting the vehicle. As before, the number of ultracapacitors and the capacity of the ultracapacitors are selected so that the total voltage of the ultracapacitors substantially matches the total voltage of the series of cells in the battery. According to the embodiment of FIG. 10, each of the four Li-ion cells has a voltage of approximately 3.3V, so that the total voltage of the battery is about 13.2V. Also, each of the six ultracapacitors has an average voltage of about 1.9V (but may be within the range of about 1V-2.8V). Accordingly, six ultracapacitors are selected so that the total voltage approximately matches the voltage of the Li-ion battery.

The system of FIG. 10 also includes the management and control system 120 that permits the Li-ion battery to quickly recharge the six ultracapacitors following discharge (e.g. engine starts). In the illustrated embodiment, the management and control system 120 includes the first management and control circuitry 122 and the second management and control circuitry 124 that cooperatively operate to provide overcharge protection and charge balance for the ultracapacitors 132. More specifically, during operation, the control circuitry 122 and 124 controls the flow of energy between the Li-ion battery 152 and the ultracapacitors 132 to permit current flow only in the direction from the Li-ion battery 152 to the ultracapacitors 132.

Further, the first control circuitry 122 is coupled to each ultracapacitor to provide overcharge protection and balancing of the charge among the ultracapacitors as current flows from the Li-ion battery 152 to the ultracapacitors 132. For example, in some embodiments, the control circuitry 122 may control the current flow such that as the flow from the Li-ion battery 152 reaches each ultracapacitor (from S1 to S6), current is directed first to S1, then to S2 and so on, until the current reaches S6. In this way, when each ultracapacitor reaches its required voltage level, the current from the Li-ion battery 152 will bypass that ultracapacitor to balance with the other ultracapacitors in the pack 132. According to other embodiments, other components or devices may be used to balance the charging of the ultracapacitors; all such variations are intended to be within the scope of this disclosure.

Figure 11:
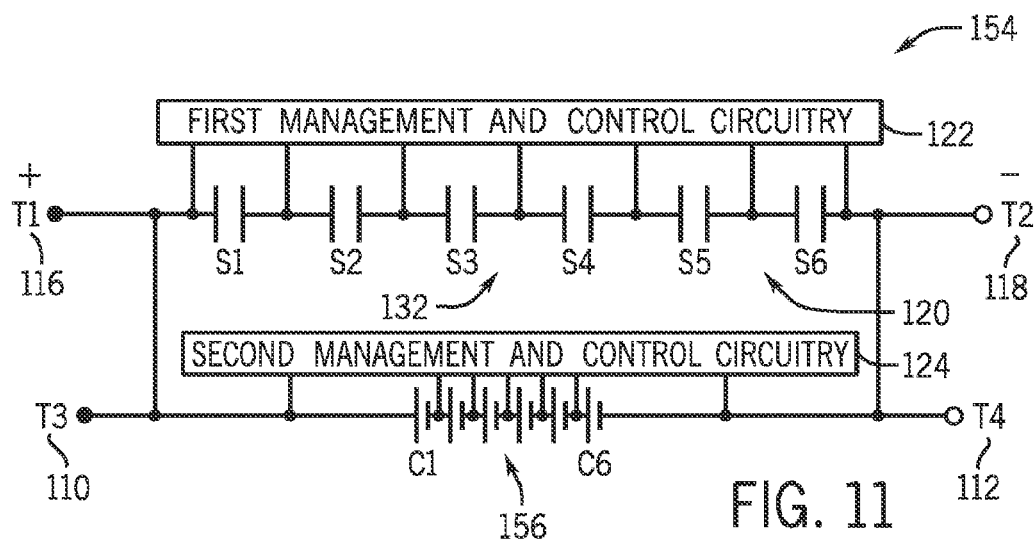
FIG. 11 is a schematic representation of a battery and ultracapacitor design for vehicle applications according to a fourth embodiment of the systems described herein.

Referring to FIG. 11, a combined 13V Li-ion (LiMn$_2$O$_4$ cathode/Li$_4$Ti$_5$O$_{12}$ anode) battery and ultracapacitor system 154 for vehicle applications with recharge capability is shown according to an exemplary embodiment. The system as shown in FIG. 11 includes a battery 156 having a number of cells (or battery units) shown as six cells C1-C6 that are connected in series with one another and to terminals T3 (110) and T4 (112), which are connected to the alternator of the vehicle's electrical system for maintaining the charge on the battery cells (and providing a power source to other electrical loads of the vehicle). The ultracapacitor pack 132 is shown connected in parallel with the battery 156 and has six individual ultracapacitors S1, S2, S3, S4, S5 and S6 connected in series with one another and to terminals T1 (116) and T2 (118), which are connected to the engine-starting portion of the vehicle's electrical system for providing relatively short and high current for starting the vehicle. The number of ultracapacitors and the capacity of the ultracapacitors are selected so that the total voltage of the ultracapacitors substantially matches the total voltage of the series of cells in the battery. According to the embodiment of FIG. 11, each of the six Li-ion cells (with a LiMn$_2$O$_4$ cathode and a Li$_4$Ti$_5$O$_{12}$ anode) has a voltage of approximately 2.2V, so that the total voltage of the battery 156 is about 13.2V. Also, each of the six ultracapacitors has an average voltage of about 1.9V (but may be within the range of about 1V-2.8V). Accordingly, six ultracapacitors are selected so that the total voltage approximately matches the voltage of the Li-ion battery.

The system of FIG. 11 also includes the management and control system 120 that permits the Li-ion battery 156 to quickly recharge the six ultracapacitors 132 following discharge (e.g. engine starts). In the illustrated embodiment, the management and control system 120 includes the first management and control circuitry 122 and the second management and control circuitry 124 that cooperatively operate to provide overcharge protection and charge balance for the ultracapacitors 132. More specifically, during operation, the control circuitry 122 and 124 controls the flow of energy between the Li-ion battery 156 and the ultracapacitors 132 to permit current flow only in the direction from the Li-ion battery 156 to the ultracapacitors 132.

Further, the first control circuitry 122 is coupled to each ultracapacitor to provide overcharge protection and balancing of the charge among the ultracapacitors as current flows from the Li-ion battery 156 to the ultracapacitors 132. For example, in some embodiments, the control circuitry 122 may control the current flow such that as the flow from the Li-ion battery 156 reaches each ultracapacitor (from S1 to S6), current is directed first to S1, then to S2 and so on, until the current reaches S6. In this way, when each ultracapacitor reaches its required voltage level, the current from the Li-ion battery 156 will bypass that ultracapacitor to balance with the other ultracapacitors in the pack 132. According to other embodiments, other components or devices may be used to balance the charging of the ultracapacitors; all such variations are intended to be within the scope of this disclosure.

Figure 12:
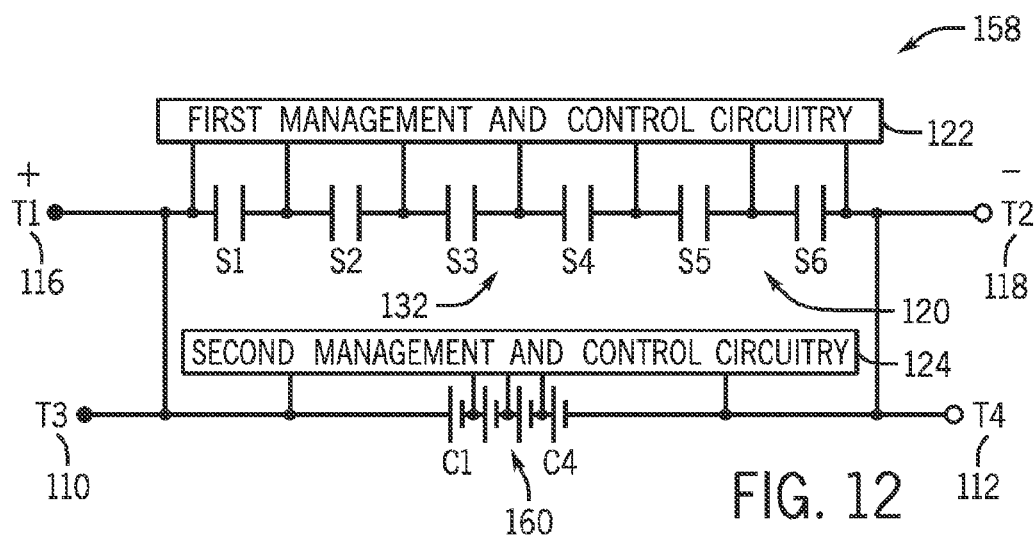
FIG. 12 is a schematic representation of a battery and ultracapacitor design for vehicle applications according to a fifth embodiment of the systems described herein.

Referring to FIG. 12, a combined 12V Li-ion (LiMn$_{3/2}$Ni$_{1/2}$O$_4$ cathode/Li$_4$Ti$_5$O$_{12}$ anode) battery and ultracapacitor system 158 for vehicle applications with recharge capability is shown according to a presently disclosed embodiment. The system 158 as shown in FIG. 12 includes a battery 160 having a number of cells (or battery units) shown as four cells C1-C4 that are connected in series with one another and to terminals T3 (110) and T4 (112), which are connected to the alternator of the vehicle's electrical system for maintaining the charge on the battery cells (and providing a power source to other electrical loads of the vehicle). The ultracapacitor pack 132 is shown connected in parallel with the battery 160 and has six individual ultracapacitors S1, S2, S3, S4, S5 and S6 connected in series with one another and to terminals T1 (116) and T2 (118), which are connected to the engine-starting portion of the vehicle's electrical system for providing relatively short and high current for starting the vehicle. The number of ultracapacitors and the capacity of the ultracapacitors are selected so that the total voltage of the ultracapacitors substantially matches the total voltage of the series of cells in the battery. According to the embodiment of FIG. 12, each of the four Li-ion cells (with a $LiMn_{3/2}Ni_{1/2}O_4$ cathode and a $Li_4Ti_5O_{12}$ anode) has a voltage of approximately 3V, so that the total voltage of the battery is about 12V. Also, each of the six ultracapacitors has an average voltage of about 1.9V (but may be within the range of about 1V-2.8V). Accordingly, six ultracapacitors are selected so that the total voltage approximately matches the voltage of the Li-ion battery.

The system of FIG. 12 also includes the management and control system 120 that permits the Li-ion battery 160 to quickly recharge the six ultracapacitors following discharge (e.g. engine starts). In the illustrated embodiment, the management and control system 120 includes the first management and control circuitry 122 and the second management and control circuitry 124 that cooperatively operate to provide overcharge protection and charge balance for the ultracapacitors 132. More specifically, during operation, the control circuitry 122 and 124 controls the flow of energy between the Li-ion battery 160 and the ultracapacitors 132 to permit current flow only in the direction from the Li-ion battery 160 to the ultracapacitors 132.

Further, the first control circuitry 122 is coupled to each ultracapacitor to provide overcharge protection and balancing of the charge among the ultracapacitors as current flows from the Li-ion battery 160 to the ultracapacitors 132. For example, in some embodiments, the control circuitry 122 may control the current flow such that as the flow from the Li-ion battery 160 reaches each ultracapacitor (from S1 to S6), current is directed first to S1, then to S2 and so on, until the current reaches S6. In this way, when each ultracapacitor reaches its required voltage level, the current from the Li-ion battery 160 will bypass that ultracapacitor to balance with the other ultracapacitors in the pack 132. According to other embodiments, other components or devices may be used to balance the charging of the ultracapacitors; all such variations are intended to be within the scope of this disclosure.

Figure 13:
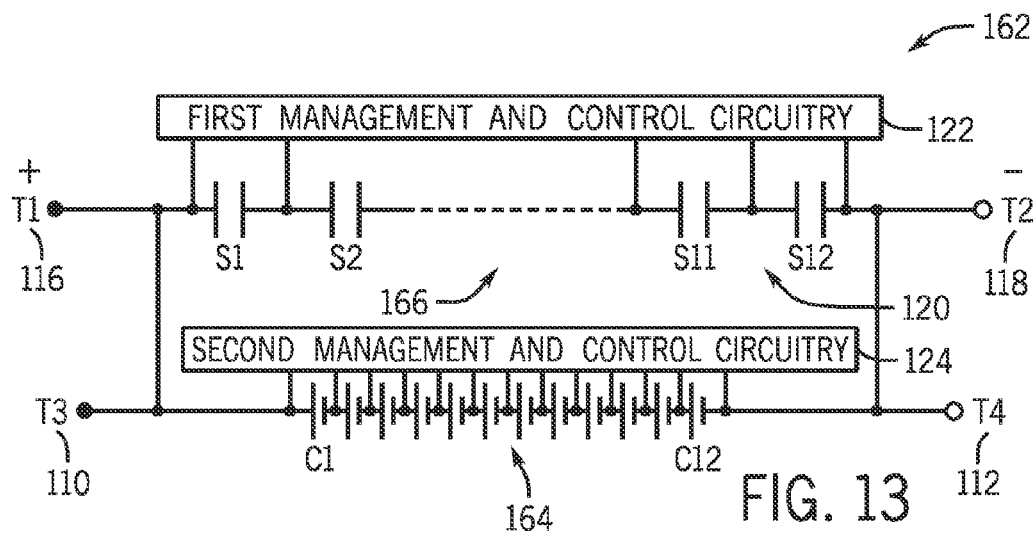
FIG. 13 is a schematic representation of a battery and ultracapacitor design for vehicle applications according to a sixth embodiment of the systems described herein.

Referring to FIG. 13, a combined 24V Pb-acid battery and ultracapacitor system 162 for vehicle applications with recharge capability is shown according to an exemplary embodiment. The system as shown in FIG. 13 includes a battery 164 having a number of cells (or battery units) shown as twelve cells C1-C12 that are connected in series with one another and to terminals T3 (110) and T4 (112), which are connected to the alternator of the vehicle's electrical system for maintaining the charge on the battery cells (and providing a power source to other electrical loads of the vehicle). An ultracapacitor pack 166 is shown connected in parallel with the battery and has twelve individual ultracapacitors S1-S12 connected in series with one another and to terminals T1 (116) and T2 (118), which are connected to the engine-starting portion of the vehicle's electrical system for providing relatively short and high current for starting the vehicle. The number of ultracapacitors and the capacity of the ultracapacitors are selected so that the total voltage of the ultracapacitors substantially matches the total voltage of the series of cells in the battery. According to the embodiment of FIG. 13, each of the twelve Pb-acid cells has a voltage of approximately 2V, so that the total voltage of the battery is about 24V. Also, each of the twelve ultracapacitors has an average voltage of about 1.9V (but may be within the range of about 1V-2.8V). Accordingly, twelve ultracapacitors are selected so that the total voltage approximately matches the voltage of the Pb-acid battery 164.

The system of FIG. 13 also includes the management and control system 120 that permits the Pb-acid battery 164 to quickly recharge the twelve ultracapacitors following discharge (e.g. engine starts). As before, in the illustrated embodiment, the management and control system 120 includes the first management and control circuitry 122 and the second management and control circuitry 124. During operation, the management and control system 120 operates to provide overcharge protection and charge balance for the ultracapacitors 132. More specifically, during operation, the control circuitry 122 and 124 controls the flow of energy between the Pb-acid battery 164 and the ultracapacitors 166 to permit current flow only in the direction from the Pb-acid battery 164 to the ultracapacitors 166.

Further, the first control circuitry 122 is coupled to each ultracapacitor to provide overcharge protection and balancing of the charge among the ultracapacitors as current flows from the Pb-acid battery 164 to the ultracapacitors 166. For example, in some embodiments, the control circuitry 122 may control the current flow such that as the flow from the Pb-acid battery 164 reaches each ultracapacitor (from S1 to S12), current is directed first to S1, then to S2 and so on, until the current reaches S12. In this way, when each ultracapacitor reaches its required voltage level, the current from the Pb-acid battery 164 will bypass that ultracapacitor to balance with the other ultracapacitors in the pack 166. According to other embodiments, other components or devices may be used to balance the charging of the ultracapacitors; all such variations are intended to be within the scope of this disclosure.

Figure 14:
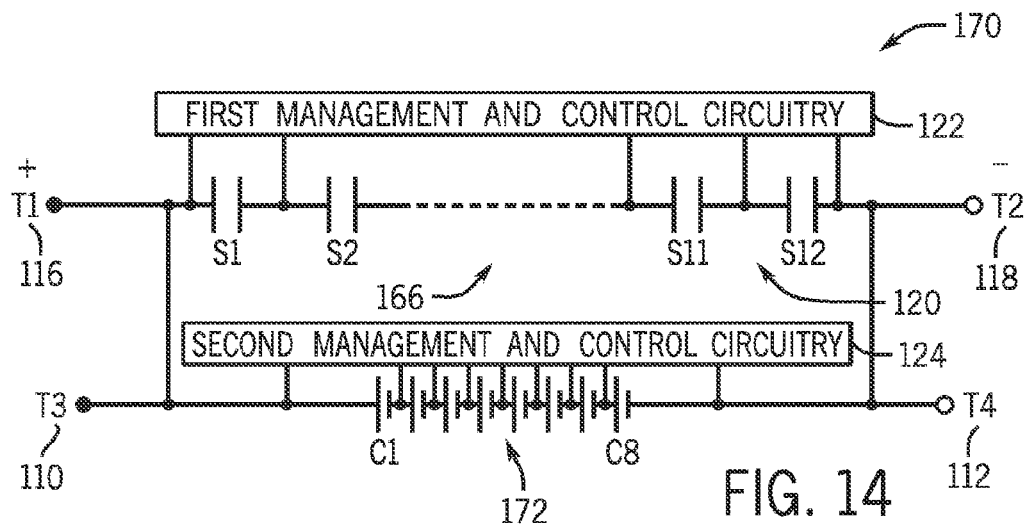
FIG. 14 is a schematic representation of a battery and ultracapacitor design for vehicle applications according to a seventh embodiment of the systems described herein.

Referring to FIG. 14, a combined 26V Li-ion (LiFePO$_4$/graphite) battery and ultracapacitor system 170 for vehicle applications with recharge capability is shown according to a presently disclosed embodiment. The system 170 as shown in FIG. 14 includes a battery 172 having a number of cells (or battery units) shown as eight cells C1-C8 that are connected in series with one another and to terminals T3 (110) and T4 (112), which are connected to the alternator of the vehicle's electrical system for maintaining the charge on the battery cells (and providing a power source to other electrical loads of the vehicle). The ultracapacitor pack 166 is shown connected in parallel with the battery 172 and has twelve individual ultracapacitors S1-S12 connected in series with one another and to terminals T1 (116) and T2 (118), which are connected to the engine-starting portion of the vehicle's electrical system for providing relatively short and high current for starting the vehicle. The number of ultracapacitors and the capacity of the ultracapacitors are selected so that the total voltage of the ultracapacitors substantially matches the total voltage of the series of cells in the battery. According to the embodiment of FIG. 14, each of the eight Li-ion cells has a voltage of approximately 3.2V, so that the total voltage of the battery 172 is about 26V. Also, each of the twelve ultracapacitors has an average voltage of about 1.9V (but may be within the range of about 1V-2.8V). Accordingly, twelve ultracapacitors are selected so that the total voltage approximately matches the voltage of the Li-ion battery.

The system of FIG. 14 also includes the management and control system 120 that permits the Li-ion battery 172 to quickly recharge the twelve ultracapacitors 166 following discharge (e.g. engine starts). As before, in the illustrated embodiment, the management and control system 120 includes the first management and control circuitry 122 and the second management and control circuitry 124. During operation, the management and control system 120 operates to provide overcharge protection and charge balance for the ultracapacitors 166. More specifically, during operation, the control circuitry 122 and 124 controls the flow of energy between the Li-ion battery 172 and the ultracapacitors 166 to permit current flow only in the direction from the Li-ion battery 172 to the ultracapacitors 166.

Further, the first control circuitry 122 is coupled to each ultracapacitor to provide overcharge protection and balancing of the charge among the ultracapacitors as current flows from the Li-ion battery 172 to the ultracapacitors 166. For example, in some embodiments, the control circuitry 122 may control the current flow such that as the flow from the Li-ion battery 172 reaches each ultracapacitor (from S1 to S12), current is directed first to S1, then to S2 and so on, until the current reaches S12. In this way, when each ultracapacitor reaches its required voltage level, the current from the Li-ion battery 172 will bypass that ultracapacitor to balance with the other ultracapacitors in the pack 166. According to other embodiments, other components or devices may be used to balance the charging of the ultracapacitors; all such variations are intended to be within the scope of this disclosure.

Figure 15:
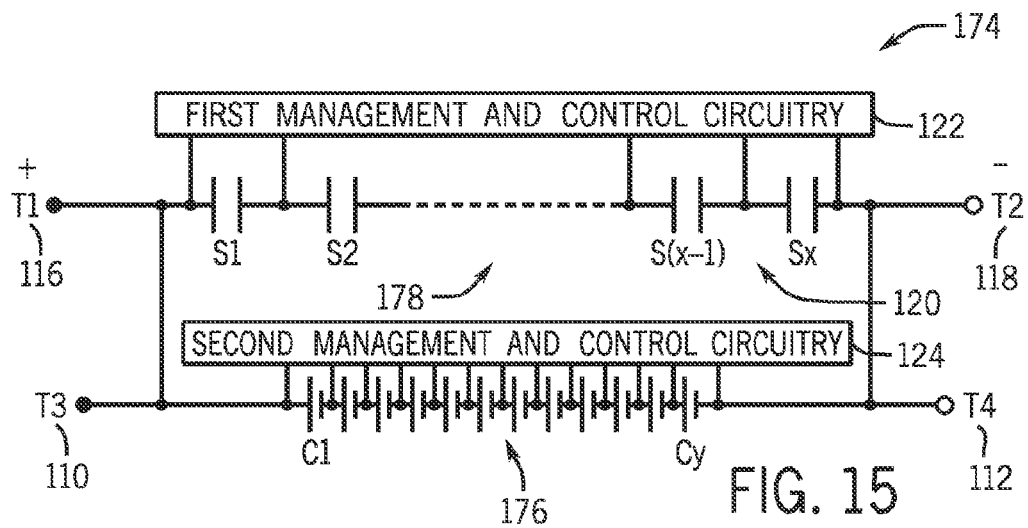
FIG. 15 is a schematic representation of a battery and ultracapacitor design for vehicle applications according to an eighth embodiment of the systems described herein.

Referring to FIG. 15, a combined 48V battery and ultracapacitor system 174 for vehicle applications with recharge capability is shown according to a presently disclosed embodiment. The system 174 as shown in FIG. 15 includes a battery 176 having a number of cells (or battery units) shown as cells C1-CY that are connected in series with one another and to terminals T3 (110) and T4 (112), which are connected to the alternator of the vehicle's electrical system for maintaining the charge on the battery cells (and providing a power source to other electrical loads of the vehicle). An ultracapacitor pack 178 is shown connected in parallel with the battery 176 and has twelve individual ultracapacitors S1-SX connected in series with one another and to terminals T1 (116) and T2 (118), which are connected to the engine-starting portion of the vehicle's electrical system for providing relatively short and high current for starting the vehicle.

In one embodiment, the battery 176 may be a Pb-acid battery including cells C1-C24, and the ultracapacitor pack 178 may include between approximately 16 and approximately 30 ultracapacitors. In another embodiment, the battery 176 may be a Li-ion battery with $LiFePO_4$ contained positive material including cells C1-C16, and the ultracapacitor pack 178 may include between approximately 16 and approximately 30 ultracapacitors. Further, in another embodiment, the battery 176 may be a Li-ion battery with $LiMn_2O_4$ contained positive material including cells C1-C13, and the ultracapacitor pack 178 may include between approximately 16 and approximately 30 ultracapacitors. Still further, in another embodiment, the battery 176 may be a Li-ion battery with $LiFePO_4$ contained positive material including cells C1-C16, and the ultracapacitor pack 178 may include between approximately 12 and approximately 24 ultracapacitors, and the ultracapacitors may be hybrid ultracapacitors with Li intercalation electrodes including a graphite contained negative electrode.

The system of FIG. 15 also includes the management and control system 120 to permit current flow only in the direction from the battery 176 to the ultracapacitors 178. As before, in the illustrated embodiment, the management and control system 120 includes the first management and control circuitry 122 and the second management and control circuitry 124. During operation, the management and control system 120 operates to provide overcharge protection and charge balance for the ultracapacitors 178, as described in detail above with respect to FIGS. 8-14.

The above-described features of the management and control systems associated with the combined battery and ultracapacitor systems may provide a variety of advantages over existing systems. For example, in certain embodiments, the combination of a high energy density battery and high power ultracapacitor at voltages within a range from approximately 24V to approximately 120V may provide advantages for a variety of types of vehicle applications, such as micro-hybrid and mild-hybrid, to improve the fuel efficiency and reduce the $CO_2$ emissions of such vehicles. As noted above, providing combined battery and ultracapacitor systems in the foregoing voltage range may offer a variety of benefits.

More specifically, in certain instances, the size of a Pb-acid battery for SLI may be determined by both the cold cranking current at low temperatures (a power-related requirement) as well as the electric load of the vehicle (e.g., lights, electronics, chassis electrifications, etc.), which is an energy-related requirement. Some current Pb-acid batteries may have an energy density of approximately 40 Wh/kg, a capacity of approximately 70 Ah, and a voltage around 12V. Accordingly such batteries may typically supply a cold cranking current around 700 Ah at −18° C. In some instances, it may be desirable to improve the density of power and energy that energy source systems are capable of providing. For example, some mild-hybrid vehicles are equipped with a motor/generator in a parallel configuration allowing the engine to be turned off when the car is coasting, braking, or stopped, yet restart quickly. Accordingly, such demands may require the energy storage device in such mild hybrid vehicles to have higher power and energy output than non-hybrid or electric SLI vehicles.

Again, by providing battery and ultracapacitor combination systems at voltages within a range from approximately 24V to approximately 120V, a variety of advantages may be realized. That is, by combining a variety of battery types and ultracapacitors into a single system, the benefits associated with each technology type may be realized in a single device. In certain embodiments, the Li-ion battery technology may provide an energy density up to approximately 200 Wh/kg (which may be approximately 5 times that of traditional Pb-acid batteries). However, some Li-ion batteries may have a discharge rate of approximately 2 C at −18° C., which is lower than the Pb-acid battery cold cranking performance (e.g., approximately 10 C). Additionally, ultracapacitors or hybrid ultracapacitors may demonstrate high power density of approximately 10 kW/kg at room temperature (or a power density reaching up to approximately 1 kW/kg at approximately −30° C.). Presently disclosed embodiments of combination energy source systems may combine the advantages of one or more of these battery types with the advantages of the ultracapacitors into a single device. Still further, by providing systems in the range from approximately 24V to approximately 120V, the resistance heat loss may be reduced at high power output, thus providing additional advantages over single device systems and systems provided in lower voltage ranges.

To facilitate back-compatibility, retrofitting, battery replacement, physical support and electrical connection, it is presently contemplated that the battery and ultracapacitor, and battery-ultracapacitor-control circuitry combinations discussed in the present disclosure may be physically packaged together in an enclosure having a form factor that conforms to conventional battery packaging. That is, a shell or enclosure may be employed for housing combinations of batteries, ultracapacitors, and, where desired, control circuitry of the type discussed herein that is similar to or identical to those used with conventional Pb-acid or other battery types. The enclosures may deviate from conventional ones in certain respects, or be colored or labeled differently to clearly indicate that the replacement includes these internal components, although it is contemplated that features such as physical dimensions useful for placing and securing the devices, such as in vehicle applications, and locations and dimensions of terminals may be the same as or sufficiently similar to the conventional batteries that they replace to permit such replacement with little or no alteration of the existing supports or wiring.

Figure 21:
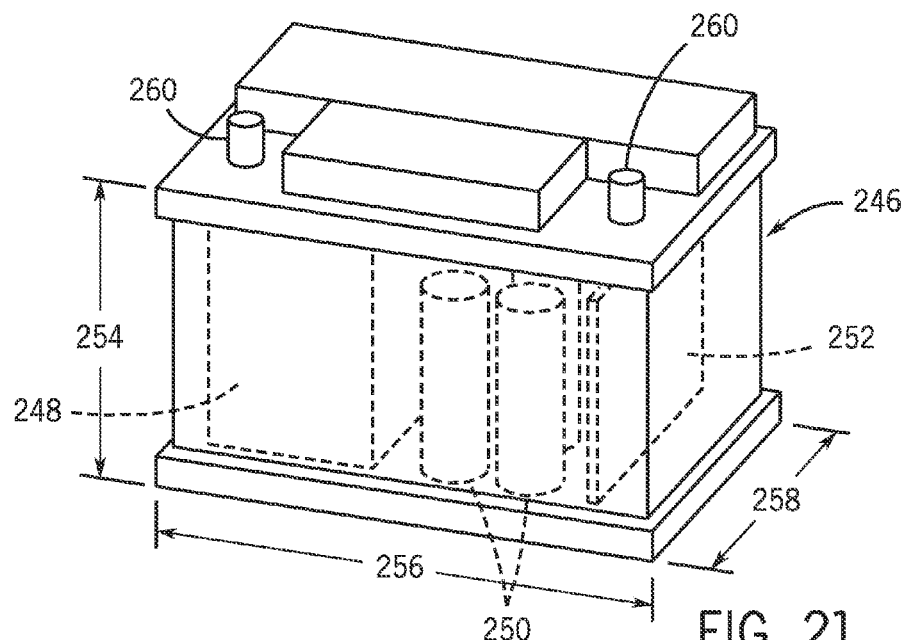
FIG. 21 illustrates an embodiment of a standard battery enclosure that is internally configured to house one or more batteries or cells and one or more ultracapacitors.
Figure 22:
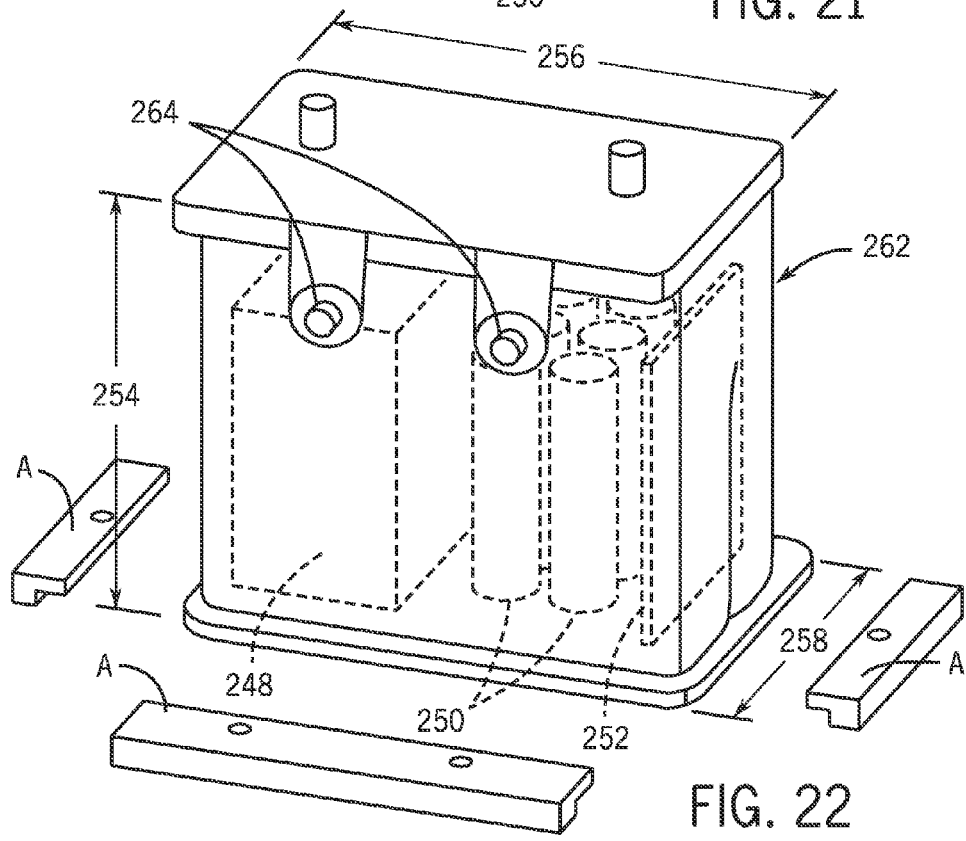
FIG. 22 illustrates an embodiment of a battery enclosure having dimensions that conform and a unique shape that may conform to those of a desired battery that the new assembly and circuitry are intended to replace.

FIG. 21 illustrates an exemplary standard battery enclosure 246 that is internally configured to house one or more batteries 248 or cells and one or more ultracapacitors 250. Optionally as well, the enclosure may contain control circuitry 252, regulation circuitry, and so forth, supported on one or multiple circuit boards. The physical dimensions of the enclosure may conform to existing standards for the particular battery type and application that the new battery is intended to replace. In particular, in the illustration of FIG. 21, the enclosure has a height 254, a width 256, and a depth 258 that are substantially the same as dimensions of a selected standard battery. In this example, the battery terminals 260 are situated in top positions offset from the battery centerline. FIG. 22 shows another exemplary battery enclosure 262 having dimensions that conform and a unique shape that may conform to those of a desired battery that the new assembly and circuitry are intended to replace. In this case, terminals may be located on the top of the enclosure, or on a front side, as indicated by reference numeral 264. Moreover, the standard form factors will include mounting or securement features, such as holddowns and so forth, as indicated generally by reference numeral N30 in FIGS. 21 and 22.

As will be appreciated by those skilled in the art, certain industry standards have been developed for use in configuring the physical packaging of batteries for many applications. For example, the Battery Council International (BCI) is a trade association that sets certain standards for vehicle batteries. A number of battery groups and sizes have been specified by the BCI. The listing below provides examples of certain of these:

| BCI Group Number | Typical Maximum Overall Dimensions | | | | | |
|---|---|---|---|---|---|---|
| | Millimeters | | | Inches | | |
| | L | W | H | L | W | H |
| PASSENGER CAR AND LIGHT COMMERCIAL BATTERIES 12-VOLT (6 CELLS) | | | | | | |
| 21 | 208 | 173 | 222 | 8³/₁₆ | 6¹³/₁₆ | 8³/₄ |
| 22F | 241 | 175 | 211 | 9½ | 6⅞ | 8⁵/₁₆ |
| 22HF | 241 | 175 | 229 | 9½ | 6⅞ | 9 |
| 22NF | 240 | 140 | 227 | 9⁷/₁₆ | 5½ | 8¹⁵/₁₆ |
| 22R | 229 | 175 | 211 | 9 | 6⅞ | 8⁵/₁₆ |
| 24 | 260 | 173 | 225 | 10¼ | 6¹³/₁₆ | 8⅞ |
| 24F | 273 | 173 | 229 | 10¾ | 6¹³/₁₆ | 9 |
| 24H | 260 | 173 | 238 | 10¼ | 6¹³/₁₆ | 9⅜ |
| 24R | 260 | 173 | 229 | 10¼ | 6¹³/₁₆ | 9 |
| 24T | 260 | 173 | 248 | 10¼ | 6¹³/₁₆ | 9¾ |
| 25 | 230 | 175 | 225 | 9¹/₁₆ | 6⅞ | 8⅞ |
| 26 | 208 | 173 | 197 | 8³/₁₆ | 6¹³/₁₆ | 7¾ |
| 26R | 208 | 173 | 197 | 8³/₁₆ | 6¹³/₁₆ | 7¾ |
| 27 | 306 | 173 | 225 | 12¹/₁₆ | 6¹³/₁₆ | 8⅞ |
| 27F | 318 | 173 | 227 | 12½ | 6¹³/₁₆ | 8¹⁵/₁₆ |
| 27H | 298 | 173 | 235 | 11¾ | 6¹³/₁₆ | 9¼ |
| 29NF | 330 | 140 | 227 | 13 | 5½ | 8¹⁵/₁₆ |
| 31 | 325 | 167 | 238 | 12¹³/₁₆ | 6⁹/₁₆ | 9⅜ |
| 31A | 325 | 167 | 238 | 12¹³/₁₆ | 6⁹/₁₆ | 9⅜ |
| 31T | 325 | 167 | 238 | 12¹³/₁₆ | 6⁹/₁₆ | 9⅜ |
| 33 | 338 | 173 | 238 | 13⁵/₁₆ | 6¹³/₁₆ | 9⅜ |
| 34 | 260 | 173 | 200 | 10¼ | 6¹³/₁₆ | 7⅞ |
| 34/78 | 260 | 175 | 200 | 10¼ | 6⅞ | 7⅞ |
| 34R | 260 | 173 | 200 | 10¼ | 6¹⁵/₁₆ | 7⅞ |
| 35 | 230 | 175 | 225 | 9¹/₁₆ | 6⅞ | 8⅞ |
| 36R | 263 | 183 | 206 | 10⅜ | 7¼ | 8⅛ |
| 40R | 277 | 175 | 175 | 10¹⁵/₁₆ | 6⅞ | 6⅞ |
| 41 | 293 | 175 | 175 | 11⁹/₁₆ | 6⅞ | 6⅞ |
| 42 | 243 | 173 | 173 | 9⁵/₁₆ | 6¹³/₁₆ | 6¹³/₁₆ |
| 43 | 334 | 175 | 205 | 13⅛ | 6⅞ | 8¹/₁₆ |
| 45 | 240 | 140 | 227 | 9⁷/₁₆ | 5½ | 8¹⁵/₁₆ |
| 46 | 273 | 173 | 229 | 10¾ | 6¹³/₁₆ | 9 |
| 47 | 246 | 175 | 190 | 9¹¹/₁₆ | 6⅞ | 7½ |
| 48 | 306 | 175 | 192 | 12¹/₁₆ | 6⅞ | 7⁹/₁₆ |
| 49 | 381 | 175 | 192 | 15 | 6⅞ | 7⁹/₁₆ |
| 50 | 343 | 127 | 254 | 13½ | 5 | 10 |
| 51 | 238 | 129 | 223 | 9⅜ | 5¹/₁₆ | 8¹³/₁₆ |
| 51R | 238 | 129 | 223 | 9⅜ | 5¹/₁₆ | 8¹³/₁₆ |
| 52 | 186 | 147 | 210 | 7⁵/₁₆ | 5¹³/₁₆ | 8¼ |
| 53 | 330 | 119 | 210 | 13 | 4¹¹/₁₆ | 8¼ |
| 54 | 186 | 154 | 212 | 7⁵/₁₆ | 6¹/₁₆ | 8⅜ |
| 55 | 218 | 154 | 212 | 8⅝ | 6¹/₁₆ | 8⅜ |
| 56 | 254 | 154 | 212 | 10 | 6¹/₁₆ | 8⅜ |
| 57 | 205 | 183 | 177 | 8¹/₁₆ | 7³/₁₆ | 6¹⁵/₁₆ |
| 58 | 255 | 183 | 177 | 10¹/₁₆ | 7³/₁₆ | 6¹⁵/₁₆ |
| 58R | 255 | 183 | 177 | 10¹/₁₆ | 7³/₁₆ | 6¹⁵/₁₆ |
| 59 | 255 | 193 | 196 | 10¹/₁₆ | 7⅝ | 7¾ |
| 60 | 332 | 160 | 225 | 13¹/₁₆ | 6⁵/₁₆ | 8⅞ |
| 61 | 192 | 162 | 225 | 7⁹/₁₆ | 6⅜ | 8⅞ |
| 62 | 225 | 162 | 225 | 8⅞ | 6⅜ | 8⅞ |
| 63 | 258 | 162 | 225 | 10³/₁₆ | 6⅜ | 8⅞ |
| 64 | 296 | 162 | 225 | 11¹¹/₁₆ | 6⅜ | 8⅞ |
| 65 | 306 | 190 | 192 | 12¹/₁₆ | 7½ | 7⁹/₁₆ |
| 70 | 208 | 179 | 196 | 8³/₁₆ | 7¹/₁₆ | 7¹¹/₁₆ |
| 71 | 208 | 179 | 216 | 8³/₁₆ | 7¹/₁₆ | 8½ |
| 72 | 230 | 179 | 210 | 9¹/₁₆ | 7¹/₁₆ | 8¼ |
| 73 | 230 | 179 | 216 | 9¹/₁₆ | 7¹/₁₆ | 8½ |
| 74 | 260 | 184 | 222 | 10¼ | 7¼ | 8¾ |
| 75 | 230 | 179 | 196 | 9¹/₁₆ | 7¹/₁₆ | 7¹¹/₁₆ |
| 75/25 | 238 | 173 | 197 | 9⅜ | 6¹³/₁₆ | 7¾ |
| 76 | 334 | 179 | 216 | 13⅛ | 7¹/₁₆ | 8½ |
| 78 | 260 | 179 | 196 | 10¼ | 7¹/₁₆ | 7¹¹/₁₆ |
| 85 | 230 | 173 | 203 | 9¹/₁₆ | 6¹³/₁₆ | 8 |
| 86 | 230 | 173 | 203 | 9¹/₁₆ | 6¹³/₁₆ | 8 |
| 90 | 246 | 175 | 175 | 9¹¹/₁₆ | 6⅞ | 6⅞ |
| 91 | 280 | 175 | 175 | 11 | 6⅞ | 6⅞ |
| 92 | 317 | 175 | 175 | 12½ | 6⅞ | 6⅞ |
| 93 | 354 | 175 | 175 | 15 | 6⅞ | 6⅞ |
| 95R | 394 | 175 | 190 | 15⁹/₁₆ | 6⅞ | 7½ |
| 96R | 242 | 173 | 175 | 9⁹/₁₆ | 6¹³/₁₆ | 6⅞ |
| 97R | 252 | 175 | 190 | 9¹⁵/₁₆ | 6⅞ | 7½ |
| 98R | 283 | 175 | 190 | 11³/₁₆ | 6⅞ | 7½ |
| PASSENGER CAR AND LIGHT COMMERCIAL BATTERIES 6-VOLT (3 CELLS) | | | | | | |
| 1 | 232 | 181 | 238 | 9⅛ | 7⅛ | 9⅜ |
| 2 | 264 | 181 | 238 | 10⅜ | 7⅛ | 9⅜ |
| 2E | 492 | 105 | 232 | 19⁷/₁₆ | 4⅛ | 9⅛ |
| 2N | 254 | 141 | 227 | 10 | 5⁹/₁₆ | 8¹⁵/₁₆ |
| 17HF | 187 | 175 | 229 | 7⅜ | 6⅞ | 9 |
| HEAVY-DUTY COMMERCIAL BATTERIES 12-VOLT (6 CELLS) | | | | | | |
| 4D | 527 | 222 | 250 | 20¾ | 8¾ | 9⅞ |
| 6D | 527 | 254 | 260 | 20¾ | 10 | 10¼ |
| 8D | 527 | 283 | 250 | 20¾ | 11⅛ | 9⅞ |
| 28 | 261 | 173 | 240 | 10⁵/₁₆ | 6¹³/₁₆ | 9⁷/₁₆ |
| 29H | 334 | 171 | 232 | 13⅛ | 6¾ | 9⅛ 10 |
| 30H | 343 | 173 | 235 | 13½ | 6¹³/₁₆ | 9¼ 10 |
| 31 | 330 | 173 | 240 | 13 | 6¹³/₁₈ | 9⁷/₁₆ |
| ELECTRIC VEHICLE BATTERIES 6-VOLT (3 CELLS) | | | | | | |
| GC2 | 264 | 183 | 270 | 10⅜ | 7³/₁₆ | 10⅝ |
| GC2H | 264 | 183 | 295 | 10⅜ | 7³/₁₆ | 11⅝ |

It should be noted that this listing is not exhaustive, and other form factors may be utilized. A number of variations in these form factors may be due to such factors as rated voltages, capacity, application, the physical mounting requirements (which may vary for different original equipment manufacturers), the terminal types and configurations, the country or region, and so forth. Terminals may be placed, for example, in top, front, side or a combination of locations. Holddown ledges and features may similarly vary with the different enclosures.

The particular shape and physical configuration of the internal battery, the ultracapacitors, and any included circuitry may be adapted for the internal space and layout available within the particular enclosures. It is contemplated that locating and securing structures, isolating structures, interconnects and so forth will be adapted within the enclosures or placed in the enclosures during assembly to locate and hold the batteries, ultracapacitors and any related circuitry in place, and to interconnect these as required for their proper electrical function. Many variations of such structures may be designed, and their particular configurations are considered to be within the ability of those skilled in the art without undue experimentation.

It should also be noted that the particular battery, ultracapacitors and any included circuitry may be of any desired type, rating, size and so forth, such as those described above. It is presently contemplated that the battery systems thus provided may be different, but in many or most cases will be such as to permit retrofitting of existing conventional batteries, such as Pb-acid batteries, glass mat batteries, and so forth. For original equipment manufacturers, such as vehicle manufacturers, the new battery systems may be installed as original equipment in the place of conventional batteries with little or no alteration in the location or physical configuration of support structures and electrical connections. The battery systems may thus be used in connection with conventional internal combustion engines, hybrid vehicles, electric vehicles, and forth. Moreover, the battery systems may be used for non-vehicular applications, such as for home or building energy storage, energy generation systems (e.g., wind or engine generators) and so forth.

It should also be noted that in certain implementations, the system enclosure may be made somewhat smaller than the standard dimensions for existing batteries, and various adapters, shims, and so forth may be used to more closely conform to existing mounting structures. Such adapters and similar hardware may be obtained in kits, sold separately or with the battery systems, and may be designed to allow the battery systems to fit within particular models or families of vehicles. As noted above, such adapters and hardware may also allow for the use of enclosures of irregular or non-standard shapes. Certain of these adapters are illustrated in FIG. 22, and labeled generally "A". These may fit on sides, the base, the top, or generally anywhere on the enclosure that may not directly conform with the desired mounting position or structures. Additional information regarding BCI battery standards, technical specifications and replacement is available in the BCI Battery Technical Manual and the BCI Battery Replacement Data Book, both available from BCI of Chicago, Ill.

It should further be noted that a variety of other circuits not illustrated herein may be provided and utilized in an energy source device in accordance with presently disclosed embodiments. For example, in certain embodiments, the energy source system 10 may include multiple battery packs, as described in detail in U.S. Provisional Patent Application No. 61/477,730, entitled "Multiple Battery System for Vehicle Applications," filed Apr. 21, 2011, which is hereby incorporated by reference. For example, in one embodiment, the energy source system 10 may include a first battery pack configured to provide electrical power to an engine starting system of a vehicle and a second battery pack configured to provide electrical power to at least one electronic system of the vehicle. Further, the battery packs may, for example, be controlled by a suitable controller, such as controller 26, and the battery packs may be provided in addition to or in place of the batteries and/or ultracapacitor systems disclosed herein, depending on a variety of implementation-specific parameters.

Figure 16:
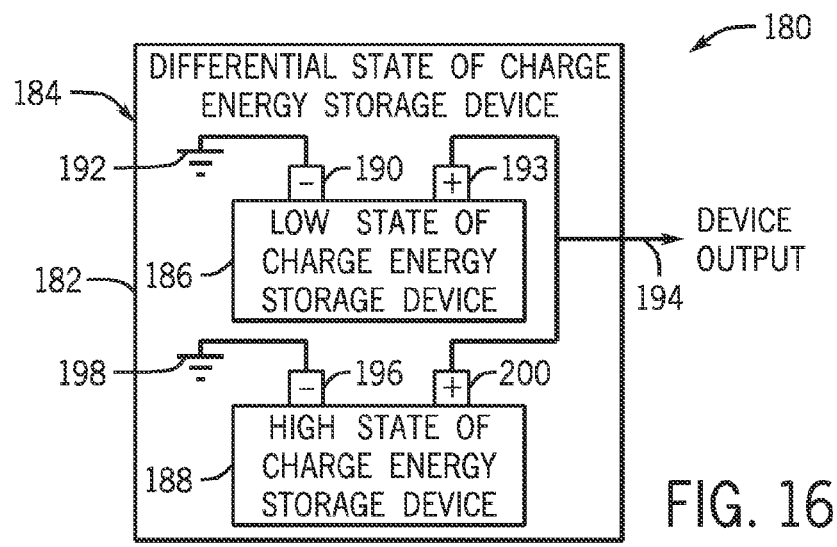
FIG. 16 illustrates an energy source system including a differential state of charge (SOC) energy storage device having a housing that encloses a low SOC energy storage device and a high SOC energy storage device in a single enclosure in accordance with an embodiment.

Still further, as shown in the embodiment of FIG. 16, an energy source system 180 includes a differential state of charge (SOC) energy storage device 182 having a housing 184 that encloses a low SOC energy storage device 186 and a high SOC energy storage device 188 in a single enclosure. In certain embodiments, the energy storage devices may be any combination of devices capable of storing energy and/or charge. For example, in some embodiments, the energy storage devices may include but are not limited to capacitors, ultracapacitors, a capacitive electrode coupled to or contained within an energy storage device, electrochemical storage devices (e.g., lithium-based batteries, nickel-based batteries, lead-based batteries, etc.), fuel cells, or any other suitable material or device capable of storing energy.

As illustrated in FIG. 16, the low SOC device 186 includes a negative terminal 190 coupled to ground 192 and a positive terminal 193 that is coupled to the device output 194. Similarly, the high SOC device 188 includes a negative terminal 196 coupled to ground 198 and a positive terminal 200 that is coupled to the device output 194. By combining the relatively low SOC device 186 with the relatively high state of charge device 188 in the housing 184, the charge acceptance and charging rate of the differential SOC device 182 may be improved compared to single SOC devices, as described in more detail below.

It should be noted that the low SOC device 186 and the high SOC device may be any suitable devices that have different states of charge relative to one another. For example, in one embodiment, the low SOC device may be a battery type that operates at approximately 30% SOC, and the high SOC device may be a battery type that operates at approximately 80% SOC. In some embodiments, the low SOC device and/or the high SOC device may be a Li-ion battery, an ultracapacitor, a Pb-acid battery or any combination or sub-combination of the foregoing devices.

Figure 17:
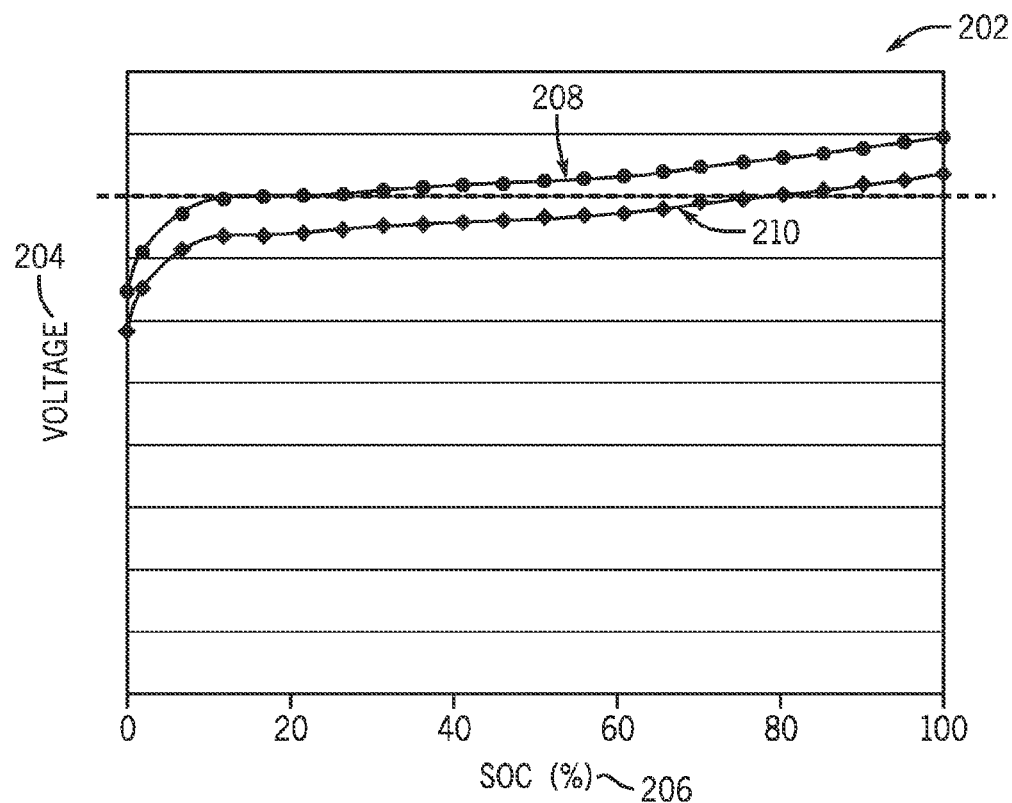
FIG. 17 illustrates an embodiment of voltage versus state of charge (SOC) curves for energy storage devices having different states of charge in accordance with an embodiment.

An example of a voltage versus SOC plot 202 for two such example devices is shown in FIG. 17. As shown, the plot 202 includes a voltage axis 204 and a percentage SOC axis 206. The plot 202 further includes a curve 208 corresponding to the operational profile of the low SOC device 186 and a plot 210 corresponding to the operational profile of the high SOC device 188. It should be noted that the differences between the curves 208 and 210 may be attributed, for example, to the operational differences between battery types. For instance, in one embodiment, the curves 208 and 210 may correspond to two different Li-ion batteries, each having a different voltage due to a different battery chemistry, anode material, cathode material, or any other parameter of the battery.

Figure 18:
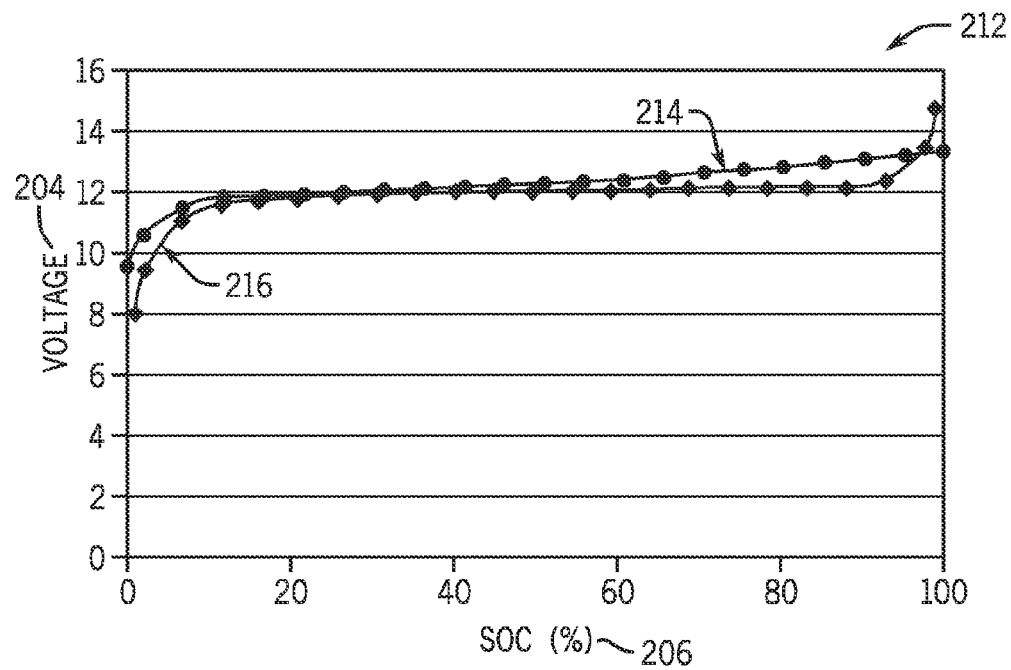
FIG. 18 illustrates an embodiment of voltage versus state of charge (SOC) curves for energy storage devices having different states of charge in accordance with an embodiment.

For further example, FIG. 18 illustrates a voltage versus SOC plot 212 for two example devices having different battery chemistries. Specifically, the plot 212 includes a curve 214 corresponding to the operational profile of the low SOC device 186 and a plot 216 corresponding to the operational profile of the high SOC device 188. In this embodiment, the low SOC device may, for example, be a Li-ion battery, and the high SOC device may, for example, by a Pb-acid battery. Here again, the differences between the curves 214 and 216 may be attributed, for example, to the differences in battery chemistry between the devices 186 and 188.

During operation, the combination of the low SOC device 186 and the high SOC device 188 may offer a variety of performance benefits as compared to single SOC systems or as compared to systems in which the single SOC device is scaled to a larger size and capability. For example, in certain embodiments, the low SOC device 186 may be charged at a higher rate than the high SOC device 188, thus offering advantages, for example, during regenerative breaking of a vehicle when the high power charging and charge acceptance of the low SOC device 186 may offset the relatively low charge acceptance of the high SOC device 188. Accordingly, a smaller overall housing 182 may be provided to house a differential SOC device as compared to a single SOC device having the same performance abilities with respect to capturing the regenerative energy during braking. The foregoing feature may be realized, for example, in an embodiment in which a Li-ion battery and a Pb-acid battery are combined into a single differential SOC device.

Figure 19:
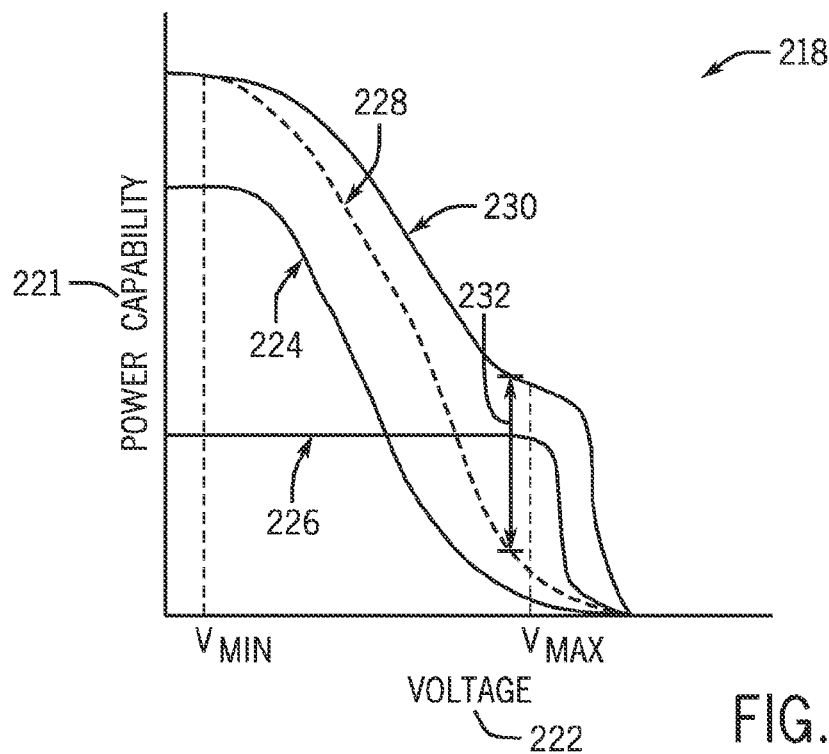
FIG. 19 illustrates a power capability advantage that may be gained by combining a low state of charge (SOC) device and a high SOC device in a single package in accordance with an embodiment.
Figure 20:
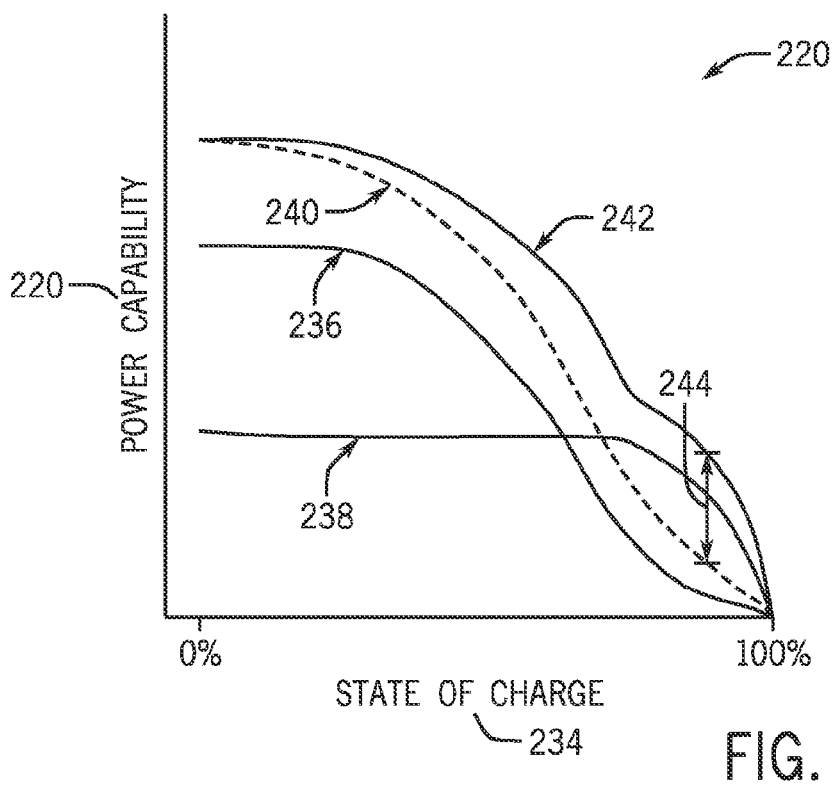
FIG. 20 illustrates a power capability advantage that may be gained by combining a low state of charge (SOC) device and a high SOC device in a single package in accordance with an embodiment.

These and other advantages of the differential SOC device 182 may be better understood by considering the plots 218 and 220 illustrated in FIGS. 19 and 20. Specifically, the plot 218 illustrated in FIG. 19 includes a charging power capability axis 221 and a voltage axis 222. The plot 218 further includes a main battery plot 224, an auxiliary battery plot 226, an increased size battery plot 228, and a differential SOC combination plot 230. As shown in FIG. 19, a distance 232 between the phantom larger size curve 228 and the differential SOC combination plot 230 visually illustrates the advantage in charging power capability that may be gained by combining the low SOC device 186 and the high SOC device 188 in the housing 182, as opposed to scaling up the size and capability of a single SOC device. Again, a variety of benefits may be gained from combining the devices 186 and 188 into the housing 184, such as an improved charging capability when the device 182 is approximately full.

The plot 220 illustrated in FIG. 20 includes the charging power capability axis 221 and a SOC axis 234. The plot 220 further includes a main battery plot 236, an auxiliary battery plot 238, an increased size battery plot 240, and a differential SOC combination plot 242. As shown in FIG. 20, a distance 244 between the phantom larger size curve 240 and the differential SOC combination plot 242 visually illustrates the advantage in charging power capability that may be gained by combining the low SOC device 186 and the high SOC device 188 in the housing 182, as opposed to scaling up the size and capability of a single SOC device. Here again, it can be seen that various advantages may be gained from combining the devices 186 and 188 into the housing 184.

According to the various exemplary embodiments, a combined battery and ultracapacitor system is provided for use in a wide variety of vehicle applications to provide a number of advantages. The parallel configuration of the ultracapacitors provides the necessary short duration and high capacity discharge necessary to meet the cold cranking current requirements of the vehicle. Also, the system permits the use of various battery technologies for storing and supplying the electricity needed for other electrical loads of the vehicle and stabilizing the electrical system voltage level during engine starts, which reduces the weight and size constraints imposed by many conventional vehicle battery and electrical systems. Further, the system permits utilizing the high power charge rate of the ultracapacitors to restore the energy during braking or stopping (e.g. regenerative braking). Additionally, as noted above, the battery and ultracapacitors may contain suitable management systems to monitor the parameters including temperature, current, and voltage to prevent them from deep-charging and discharging. Accordingly, all such variations are intended to be within the scope of this disclosure.

Figure 23:
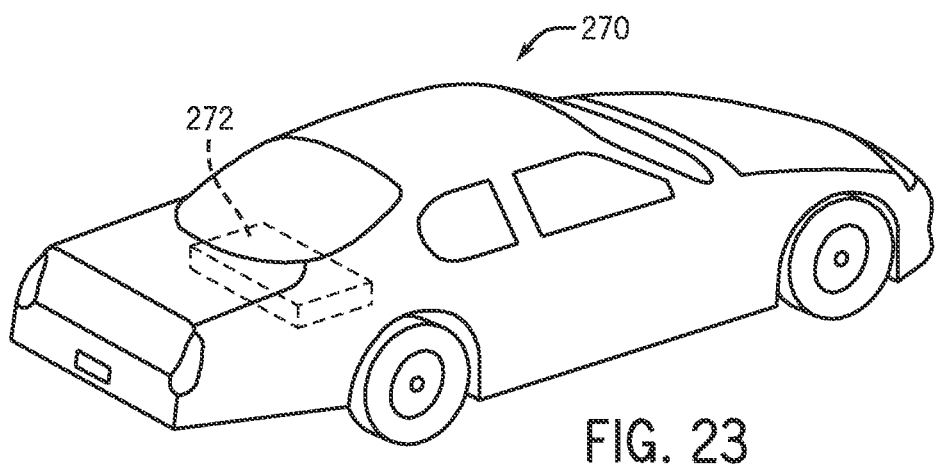
FIG. 23 is perspective view of an embodiment of a vehicle having a battery module or system for providing all or a portion of the motive power for the vehicle.

The various combined battery and ultracapacitor systems provided herein are adaptable and scalable to fit a wide variety of applications, including start/stop, micro-hybrid, and electric vehicle applications, and to suit a wide variety of voltage requirements. For example, in one embodiment, as shown in FIG. 23, a vehicle 270 in the form of an automobile (e.g., a car) having a battery module or system 272 for providing all or a portion of the motive power for the vehicle 270. In some embodiments, the vehicle 270 may be an electric vehicle (EV), a hybrid electric vehicle (HEV), a plug-in hybrid electric vehicle (PHEV), or any other type of vehicle using electric power for propulsion (collectively referred to as "electric vehicles"). Additionally, although illustrated as a car in FIG. 23, the type of the vehicle 270 may be implementation-specific, and, accordingly, may differ in other embodiments, all of which are intended to fall within the scope of the present disclosure. For example, the vehicle 270 may be a truck, bus, industrial vehicle, motorcycle, recreational vehicle, boat, or any other type of vehicle that may benefit from the use of electric power for all or a portion of its propulsion power.

Further, although the battery module 272 is illustrated in FIG. 23 as being positioned in the trunk or rear of the vehicle 270, according to other exemplary embodiments, the location of the battery module 272 may differ. For example, the position of the battery module 272 may be selected based on the available space within the vehicle 270, the desired weight balance of the vehicle 270, the location of other components used with the battery system (e.g., battery management systems, vents or cooling devices, etc.), and a variety of other implementation-specific considerations.

Figure 24:
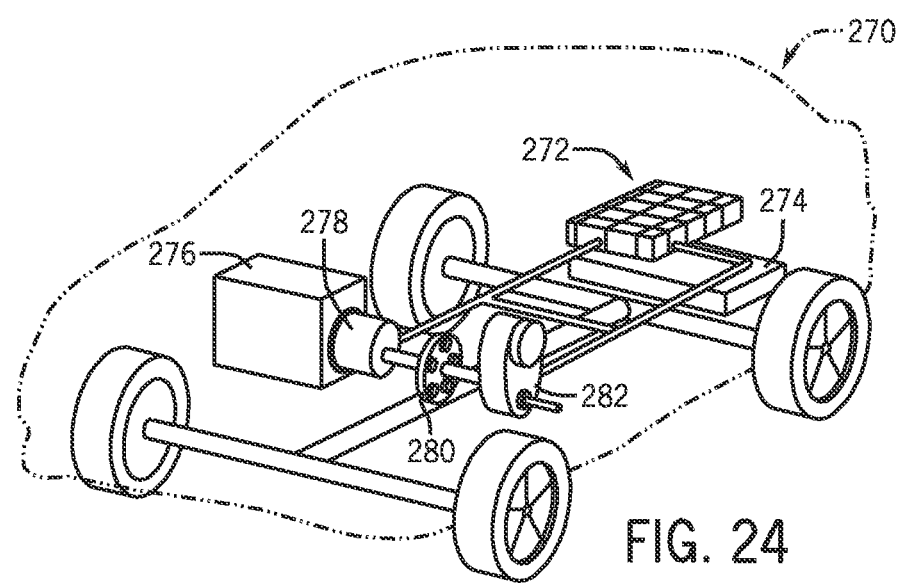
FIG. 24 illustrates a cutaway schematic view of an embodiment of the vehicle of FIG. 23 provided in the form of a hybrid electric vehicle.

FIG. 24 illustrates a cutaway schematic view of the vehicle 270 provided in the form of an HEV according to a presently disclosed embodiment. In the illustrated embodiment, the battery module or system 272 is provided toward the rear of the vehicle 270 proximate a fuel tank 274. However, in other embodiments, the battery module 272 may be provided immediately adjacent the fuel tank 274 or may be provided in a separate compartment in the rear of the vehicle 270 (e.g., a trunk) or may be provided elsewhere in the vehicle 270. An internal combustion engine 276 is provided for times when the HEV utilizes gasoline power to propel the vehicle 270. An electric motor 278, a power split device 280, and a generator 282 are also provided as part of the vehicle drive system. Such an HEV may be powered or driven by just the battery system 272, by just the engine 276, or by both the battery system 272 and the engine 276. It should be noted that other types of vehicles and configurations for the vehicle electrical system may be used according to other embodiments, and that the schematic illustration of FIG. 24 should not be considered to limit the scope of the subject matter described in the present application. Indeed, according to various other embodiments, the size, shape, and location of the battery module or system 272, the type of vehicle 270, the type of vehicle technology (e.g., EV, HEV, PHEV, etc.), and the battery chemistry, among other features, may differ from those shown or described.

According to an embodiment, the battery module or system 272 is responsible for packaging or containing electrochemical cells or batteries, connecting the electrochemical cells to each other and/or to other components of the vehicle electrical system, and regulating the electrochemical cells and other features of the battery system 272. For example, the battery module or system 272 may include features that are responsible for monitoring and controlling the electrical performance of the system, managing the thermal behavior of the system, containment and/or routing of effluent (e.g., gases that may be vented from a battery cell), and other aspects of the battery module or system.

Here again, it should also be noted that the present techniques also apply to storage and use of energy in vehicles that do not use or sometimes use electrical energy for propulsion. For example, such vehicles may include conventional internal combustion engines used for propulsion, or vehicles that may employ regenerative braking, but not use the resulting energy directly for propulsion. Moreover, the techniques may be particularly advantageous in any vehicle in certain use cases. For example, in so-called stop-start applications the vehicle engine or prime mover may be shut off at certain times (e.g., when stopped at an intersection) and restarted each time, resulting in a need for starting energy. Finally, it should be noted that the techniques may be advantageous for any of a range of cases both vehicular and non-vehicular, such as for driving accessories, electrical loads, and so forth.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that the orientation of various elements may differ according to other exemplary embodiments, and that such variations are intended to be encompassed by the present disclosure.

It is also important to note that the construction and arrangement of the combined battery and ultracapacitor systems for vehicle applications as shown in the various exemplary embodiments is illustrative only. Although only a few embodiments of the present inventions have been described in detail in this disclosure, those skilled in the art who review this disclosure will readily appreciate that many modifications are possible (e.g., variations in battery chemistry and material, quantities and capacities, selection of ultracapacitor size and capacity, etc.) without materially departing from the novel teachings and advantages of the subject matter disclosed herein. For example, the battery technologies may include any one or more of Li-ion, Pb-acid, Ni-M(H), Ni—Zn, or other battery technologies. Further, the balancing of the charge to the ultracapacitors may be accomplished by other suitable electronic components. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions.

The invention claimed is:

1. An energy source system, comprising:
    a battery comprising one or more electrochemical cells coupled in series with one another;
    an ultracapacitor;
    a first switching device coupled to the battery and configured to selectively connect and disconnect the battery to a load;
    a second switching device coupled to the ultracapacitor and configured to selectively connect and disconnect the ultracapacitor to the load;
    a direct current to direct current (DC-DC) converter configured to electrically couple the battery to the ultracapacitor;
    a sensing system configured to sense an operational parameter of the battery, an operational parameter of the ultracapacitor, and a load parameter; and
    a controller coupled to the first switching device, the second switching device, and the DC-DC converter and configured to:
        detect a first engine start signal;
        determine, upon detecting the first engine start signal and based on the sensed operational and load parameters, whether energy stored in the battery is sufficient to start an internal combustion engine associated with an electromechanical vehicle;
        determine, based on the sensed operational and load parameters, a desired energy flow between the battery, the ultracapacitor, the DC-DC converter, and the load when the energy stored in the battery is not sufficient to start the internal combustion engine;
        and control the first switching device, the second switching device, and the DC-DC converter to achieve the determined energy flow, such that the ultracapacitor is charged to a state sufficient to start the internal combustion engine during a time lapse between receiving the first engine start signal and receiving a second engine start signal, and wherein the ultracapcitor is coupled to the load in place of the battery via the second switching device.

2. The system of claim 1, wherein the load comprises a starting load from the internal combustion engine of the electromechanical vehicle.

3. The system of claim 2, wherein the controller is configured to control the DC-DC converter to transfer energy from the battery to the ultracapacitor when the operational parameter of the battery indicates that the battery does not have enough stored energy to meet the starting load.

4. The system of claim 3, wherein the controller is configured to control the second switching device to couple the ultracapacitor to the load to meet the starting load.

5. The system of claim 1, wherein the first switching device comprises a field-effect transistor configured to connect and disconnect the battery to the load in a variable manner.

6. The system of claim 1, wherein the second switching device comprises a field-effect transistor configured to connect and disconnect the ultracapacitor to the load in a variable manner.

7. The system of claim 1, wherein the battery comprises a Pb-acid battery.

8. The system of claim 1, wherein the battery comprises a Ni-M(H) battery.

9. The system of claim 1, wherein the battery comprises a Ni-Zn battery.

10. The system of claim 1, wherein the operational parameter of the battery comprises the voltage of the battery, the operational parameter of the ultracapacitor comprises the voltage of the ultracapacitor, and the load parameter comprises the load voltage.

11. The energy source system of claim 1, wherein the energy source system is disposed within a single housing.

12. The energy storage system of claim 1, such that receiving the second engine start signal comprises the controller allowing the second engine start signal to be received upon the ultracapacitor being charged to the sufficient state to start the internal combustion engine.

13. A method for controlling an energy source system, comprising:
receiving a first engine start signal;
determining, upon receiving the first engine start signal and based on a received input, whether energy stored in a battery is sufficient to start an internal combustion engine associated with an electromechanical vehicle;
controlling a direct current to direct current (DC-DC) converter to transfer energy from the battery to an ultracapacitor when the energy stored in the battery is not sufficient to start the internal combustion engine, wherein the ultracapacitor is charged to a state sufficient to start the internal combustion engine during a time lapse between receiving the first engine start signal and receiving a second engine start signal; and
controlling a switch coupled to the ultracapacitor to electrically couple the ultracapacitor to the internal combustion engine to enable a first flow of energy from the ultracapacitor to the internal combustion engine to start the internal combustion engine in place of a second flow of energy from the battery to the internal combustion engine when the energy stored in the battery is not sufficient to start the internal combustion engine.

14. The method of claim 13, wherein the battery comprises a Pb-acid battery.

15. The method of claim 13, wherein the battery comprises a Li-ion battery.

16. The method of claim 13, wherein the battery comprises a Ni-M (H) battery.

17. The method of claim 13, wherein the battery comprises a Ni-Zn battery.

18. The method of claim 13, comprising controlling a second switch coupled to the battery to electrically couple the battery to the internal combustion engine to enable the second flow of energy from the battery to the internal combustion engine to start the internal combustion engine when the energy stored in the battery is sufficient to start the internal combustion engine.

19. A controller for an energy source system having a plurality of energy storage devices, configured to:
receive a first engine start signal;
determine, upon receiving the first engine start signal and based on a received input, whether energy stored in a battery is sufficient to start an internal combustion engine associated with an electromechanical vehicle;
control a direct current to direct current (DC-DC) converter to transfer energy from the battery to an ultracapacitor when the energy stored in the battery is not sufficient to start the internal combustion engine, such that the ultracapacitor is charged to a state sufficient to start the internal combustion engine during a time lapse between receiving the first engine start signal and receiving a second engine start signal; and
control a first switch coupled to the ultracapacitor to electrically couple the ultracapacitor to the internal combustion engine to enable a first flow of energy from the ultracapacitor to the internal combustion engine to start the internal combustion engine in place of a second flow of energy from the battery to the internal combustion engine when the energy stored in the battery is not sufficient to start the internal combustion engine.

20. The controller of claim 19, configured to control a second switch coupled to the battery to electrically couple the battery to the internal combustion engine to enable a flow of energy from the battery to the internal combustion engine to start the internal combustion energy when the energy stored in the battery is sufficient to start the internal combustion engine.

* * * * *